US012484021B2

(12) United States Patent
Elshafie et al.

(10) Patent No.: US 12,484,021 B2
(45) Date of Patent: Nov. 25, 2025

(54) COOPERATIVE AND COORDINATED SENSING TECHNIQUES FOR WIRELESS COMMUNICATIONS SYSTEMS

(71) Applicant: QUALCOMM Incorporated, San Diego, CA (US)

(72) Inventors: Ahmed Elshafie, San Diego, CA (US); Gabi Sarkis, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 17/168,946

(22) Filed: Feb. 5, 2021

(65) Prior Publication Data

US 2022/0256506 A1    Aug. 11, 2022

(51) Int. Cl.
*H04W 72/02*      (2009.01)
*H04W 16/14*      (2009.01)
*H04W 72/0446*    (2023.01)
*H04W 76/14*      (2018.01)
*H04W 88/04*      (2009.01)

(52) U.S. Cl.
CPC .......... *H04W 72/02* (2013.01); *H04W 16/14* (2013.01); *H04W 72/0446* (2013.01); *H04W 76/14* (2018.02); *H04W 88/04* (2013.01)

(58) Field of Classification Search
CPC . H04W 72/02; H04W 16/14; H04W 72/0446; H04W 76/14; H04W 88/04
See application file for complete search history.

(56) References Cited

U.S. PATENT DOCUMENTS

| 2018/0220463 A1* | 8/2018 | Fodor | H04W 72/0406 |
| 2020/0229173 A1* | 7/2020 | Cao | H04W 72/51 |
| 2020/0280961 A1* | 9/2020 | Lee | H04W 4/40 |

(Continued)

FOREIGN PATENT DOCUMENTS

WO    WO-2021234167 A1    11/2021

OTHER PUBLICATIONS

Lenovo, et al., "Sidelink Resource Allocation for Power saving", 3GPP Draft, R1-2100766, 3GPP TSG RAN WG1 #104-e, 3rd Generation Partnership Project (3GPP), France, vol. RAN WG1, No. e-Meeting, Jan. 25, 2021-Feb. 5, 2021, Jan. 18, 2021 (Jan. 18, 2021), XP051970512, 9 Pages (Year: 2021).*

(Continued)

*Primary Examiner* — Thinh D Tran
(74) *Attorney, Agent, or Firm* — Holland & Hart/QUALCOMM Incorporated

(57) ABSTRACT

Methods, systems, and devices for wireless communications are described. A first user equipment (UE) may monitor a set of sidelink resources for a first portion of one or more sensing windows in accordance with a monitoring pattern. The monitoring pattern may indicate a first portion of the one or more sensing windows or a second portion of the one or more sensing windows. The first UE may transmit control signaling indicating a result of monitoring the set of sidelink resources for the first portion. The first UE may transmit data to at least a second UE based at least in part on transmitting the control signaling. In some examples, the second UE, a third UE, or both may indicate a result of monitoring a third portion or a fourth portion of the one or more sensing windows.

59 Claims, 14 Drawing Sheets

(56) References Cited

U.S. PATENT DOCUMENTS

| | | | |
|---|---|---|---|
| 2022/0046596 A1* | 2/2022 | Chen | H04W 24/08 |
| 2022/0046620 A1* | 2/2022 | Ye | H04W 72/0406 |
| 2022/0110060 A1* | 4/2022 | Yang | H04W 72/02 |
| 2022/0116942 A1* | 4/2022 | Fouad | H04W 56/0015 |
| 2022/0330038 A1* | 10/2022 | Ganesan | H04W 52/10 |

OTHER PUBLICATIONS

Moderator (OPPO), "FL summary for AI 8.11.2.1—resource allocation for power saving", R1-20xxxxx, 3GPP TSG RAN WG1 #103-e, e-Meeting, Oct. 26-Nov. 13, 2020 (Year: 2020).*
Fouad et al., "Reduced Sensing Schemes for Sidelink Enhancement", U.S. Appl. No. 63/089,762, filed Oct. 9, 2020 (Year: 2020).*
LG Electronics, "Discussion on resource allocation for power saving", 3GPP TSG RAN WG1 Meeting #104-e, R1-2100517 available on Jan. 19, 2021 (Year: 2021).*
CEWIT: "Feasibility and Benefits for NR Sidelink Mode 2 Enhancements", 3GPP Draft, 3GPP TSG RAN WG1 104-e, R1-2101647, 3rd Generation Partnership Project (3GPP), Mobile Competence Centre, 650, Route Des Lucioles, F-06921 Sophia-Antipolis Cedex, France, vol. RAN WG1, No. e-meeting, Jan. 25, 2021-Feb. 5, 2021, Jan. 18, 2021 (Jan. 18, 2021), XP051971802, 5 Pages, Retrieved from the Internet: URL: https://ftp.3gpp.org/tsg_ran/WG1_RL1/TSGR1_104-e/Docs/R1-2101647.zip R1-2101647.docx, [Retrieved on Jan. 18, 2021 ] section 1, p. 1-p. 2 section 2, p. 2-p. 4, the whole document.
International Search Report and Written Opinion—PCT/US2022/011437—ISA/EPO—Apr. 28, 2022.
Lenovo, et al., "Sidelink Resource Allocation for Power saving", 3GPP Draft, R1-2100766, 3GPP TSG RAN WG1 #104-e, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 18, 2021 (Jan. 18, 2021 ), XP051970512, 9 Pages, Retrieved from the Internet: URL:https://ftp.3gpp.org/tsg_ran/WG1_RL1/TSGR1_104-e/Docs/R1-2100766.zip R1-2100766 .docx [retrieved on Jan. 18, 2021 ] the whole document.
VIVO: "Discussion on Sidelink DRX", 3GPP Draft, R1-2007690, 3GPP TSG-RAN WG1 Meeting #103-e, 3rd Generation Partnership Project (3GPP), Mobile Competence Centre, 650, Route Des Lucioles, F-06921, Sophia-Antipolis Cedex, France, vol. RAN WG1, No. e-Meeting, Oct. 26, 2020-Nov. 13, 2020, Oct. 24, 2020 (Oct. 24, 2020), XP051946481, 5 Pages, Retrieved from the Internet: URL:https://ftp.3qpp.org/tsg_ran/WG1_RL1/TSGR1_103-e/Docs/R1-2007690.zip R1-2007690 Discussion on sidelink DRX-final.docx [retrieved on Oct. 24, 2020] the whole document.
3GPP TS 38.214 "3rd Generation Partnership Project, Technical Specification Group Radio Access Network, NR, Physical layer procedures for data (Release 16)", V16.3.0, pp. 152-154, Sep. 2020, 3GPP Organizational Partners, Sophia Antipolis Valbonne, France, pp. 1-166.
3GPP TS 38.321: "3rd Generation Partnership Project, Technical Specification Group Radio Access Network, NR, Medium Access Control (MAC) protocol specification (Release 16)", V16.2.1, Sep. 2020, pp. 85-90, 3GPP Organizational Partners, Sophia Antipolis Valbonne, France, pp. 1-154.

* cited by examiner

COOPERATIVE AND COORDINATED SENSING TECHNIQUES FOR WIRELESS COMMUNICATIONS SYSTEMS

INTRODUCTION

The following relates to wireless communications, and more specifically, sensing techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a first user equipment (UE) is described. The method may include monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion, transmitting, to one or more UEs, control signaling indicating a result of monitoring the set of sidelink resources for the first portion of the one or more sensing windows in accordance with the monitoring pattern, and transmitting data to at least a second UE based on transmitting the control signaling.

An apparatus for wireless communications at a first UE is described. The apparatus may include a processor and memory coupled to the processor, the processor and memory configured to monitor a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion, transmit, to one or more UEs, control signaling indicating a result of monitoring the set of sidelink resources for the first portion of the one or more sensing windows in accordance with the monitoring pattern, and transmit data to at least a second UE based on transmitting the control signaling.

Another apparatus for wireless communications at a first UE is described. The apparatus may include means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion, means for transmitting, to one or more UEs, control signaling indicating a result of monitoring the set of sidelink resources for the first portion of the one or more sensing windows in accordance with the monitoring pattern, and means for transmitting data to at least a second UE based on transmitting the control signaling.

A non-transitory computer-readable medium storing code for wireless communications at a first UE is described. The code may include instructions executable by a processor to monitor a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion, transmit, to one or more UEs, control signaling indicating a result of monitoring the set of sidelink resources for the first portion of the one or more sensing windows in accordance with the monitoring pattern, and transmit data to at least a second UE based on transmitting the control signaling.

In some examples of the method, apparatuses, and non-transitory computer-readable medium described herein, the first portion includes a first sensing window of the one or more sensing windows and the second portion includes a second sensing window of the one or more sensing windows.

Some examples of the method, apparatuses, and non-transitory computer-readable medium described herein may further include operations, features, means, or instructions for receiving, from the second UE, second control signaling indicating a second result of the second UE monitoring a third portion of the one or more sensing windows, the third portion including the first sensing window, the second sensing window, or a combination thereof.

In some examples of the method, apparatuses, and non-transitory computer-readable medium described herein, the first portion includes a first duration of a first sensing window and the second portion includes a second duration of the first sensing window.

Some examples of the method, apparatuses, and non-transitory computer-readable medium described herein may further include operations, features, means, or instructions for receiving, from the second UE, second control signaling indicating a second result of the second UE monitoring a third portion of the one or more sensing windows, the third portion including the first duration of the first sensing window, the second duration of the first sensing window, or a third duration overlapping with one or both of the first duration and the second duration.

Some examples of the method, apparatuses, and non-transitory computer-readable medium described herein may further include operations, features, means, or instructions for generating the monitoring pattern associated with monitoring the first portion of the one or more sensing windows, where the monitoring pattern includes a random pattern.

Some examples of the method, apparatuses, and non-transitory computer-readable medium described herein may further include operations, features, means, or instructions for receiving an indication of the monitoring pattern from the second UE, a third UE, a base station, or any combination thereof.

Some examples of the method, apparatuses, and non-transitory computer-readable medium described herein may further include operations, features, means, or instructions for receiving a second indication that the second UE or the third UE may be a controller UE, where receiving the indication of the monitoring pattern may be based on the second UE or the third UE being the controller UE.

Some examples of the method, apparatuses, and non-transitory computer-readable medium described herein may further include operations, features, means, or instructions for receiving second control signaling indicating a second result of at least the second UE monitoring the set of sidelink resources for a third portion of the one or more sensing windows.

Some examples of the method, apparatuses, and non-transitory computer-readable medium described herein may further include operations, features, means, or instructions for selecting resources of the set of sidelink resources for transmitting the data based on receiving the second control signaling, where the result and the second result indicate that the selected resources may be available.

Some examples of the method, apparatuses, and non-transitory computer-readable medium described herein may further include operations, features, means, or instructions for transmitting second control signaling indicating reserved resources of the set of sidelink resources and transmitting the data to at least the second UE via the reserved resources.

A method for wireless communications at a second UE is described. The method may include monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion, transmitting, to one or more UEs, control signaling indicating a result of monitoring the set of sidelink resources for the first portion of the one or more sensing windows in accordance with the monitoring pattern, and receiving data from at least a first UE based on transmitting the control signaling.

An apparatus for wireless communications at a second UE is described. The apparatus may include a processor and memory coupled to the processor, the processor and memory configured to monitor a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion, transmit, to one or more UEs, control signaling indicating a result of monitoring the set of sidelink resources for the first portion of the one or more sensing windows in accordance with the monitoring pattern, and receive data from at least a first UE based on transmitting the control signaling.

Another apparatus for wireless communications at a second UE is described. The apparatus may include means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion, means for transmitting, to one or more UEs, control signaling indicating a result of monitoring the set of sidelink resources for the first portion of the one or more sensing windows in accordance with the monitoring pattern, and means for receiving data from at least a first UE based on transmitting the control signaling.

A non-transitory computer-readable medium storing code for wireless communications at a second UE is described. The code may include instructions executable by a processor to monitor a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion, transmit, to one or more UEs, control signaling indicating a result of monitoring the set of sidelink resources for the first portion of the one or more sensing windows in accordance with the monitoring pattern, and receive data from at least a first UE based on transmitting the control signaling.

In some examples of the method, apparatuses, and non-transitory computer-readable medium described herein, the first portion includes a first sensing window of the one or more sensing windows and the second portion includes a second sensing window of the one or more sensing windows.

Some examples of the method, apparatuses, and non-transitory computer-readable medium described herein may further include operations, features, means, or instructions for receiving, from the first UE, second control signaling indicating a second result of the first UE monitoring a third portion of the one or more sensing windows, the third portion including the first sensing window, the second sensing window, or a combination thereof.

In some examples of the method, apparatuses, and non-transitory computer-readable medium described herein, the first portion includes a first duration of a first sensing window and the second portion includes a second duration of the first sensing window.

Some examples of the method, apparatuses, and non-transitory computer-readable medium described herein may further include operations, features, means, or instructions for receiving, from the first UE, second control signaling indicating a second result of the first UE monitoring a third portion of the one or more sensing windows, the third portion including the first duration of the first sensing window, the second duration of the first sensing window, or a third duration overlapping with one or both of the first duration and the second duration.

Some examples of the method, apparatuses, and non-transitory computer-readable medium described herein may further include operations, features, means, or instructions for generating the monitoring pattern associated with monitoring the first portion of the one or more sensing windows, where the monitoring pattern includes a random pattern.

Some examples of the method, apparatuses, and non-transitory computer-readable medium described herein may further include operations, features, means, or instructions for receiving an indication of the monitoring pattern from the first UE, a third UE, a base station, or any combination thereof.

Some examples of the method, apparatuses, and non-transitory computer-readable medium described herein may further include operations, features, means, or instructions for receiving a second indication that the first UE or the third UE may be a controller UE, where receiving the indication of the monitoring pattern may be based on the first UE or the third UE being the controller UE.

Some examples of the method, apparatuses, and non-transitory computer-readable medium described herein may further include operations, features, means, or instructions for receiving second control signaling indicating a second result of at least the first UE monitoring the set of sidelink resources for a third portion of the one or more sensing windows.

Some examples of the method, apparatuses, and non-transitory computer-readable medium described herein may further include operations, features, means, or instructions for receiving, from the first UE, second control signaling indicating reserved resources of the set of sidelink resources and receiving the data via the reserved resources.

A method for wireless communications at a third UE is described. The method may include monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion and transmitting, to at least a first UE and a second UE, control signaling indicating a result of monitoring the set of sidelink resources for the first portion of the one or more sensing windows in accordance with the monitoring pattern.

An apparatus for wireless communications at a third UE is described. The apparatus may include a processor and memory coupled to the processor, the processor and memory configured to monitor a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion and transmit, to at least a first UE and a second UE, control signaling indicating a result of monitoring the set of sidelink resources for the first portion of the one or more sensing windows in accordance with the monitoring pattern.

Another apparatus for wireless communications at a third UE is described. The apparatus may include means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion and means for transmitting, to at least a first UE and a second UE, control signaling indicating a result of monitoring the set of sidelink resources for the first portion of the one or more sensing windows in accordance with the monitoring pattern.

A non-transitory computer-readable medium storing code for wireless communications at a third UE is described. The code may include instructions executable by a processor to monitor a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion and transmit, to at least a first UE and a second UE, control signaling indicating a result of monitoring the set of sidelink resources for the first portion of the one or more sensing windows in accordance with the monitoring pattern.

In some examples of the method, apparatuses, and non-transitory computer-readable medium described herein, the first portion overlaps with a third portion of the one or more sensing windows monitored by the first UE, a fourth portion of the one or more sensing windows monitored by the second UE, or a combination thereof.

In some examples of the method, apparatuses, and non-transitory computer-readable medium described herein, the first portion includes a first sensing window of the one or more sensing windows and the second portion includes a second window of the one or more sensing windows.

In some examples of the method, apparatuses, and non-transitory computer-readable medium described herein, the first portion includes a first duration of a first sensing window and the second portion includes a second duration of the first sensing window.

Some examples of the method, apparatuses, and non-transitory computer-readable medium described herein may further include operations, features, means, or instructions for receiving, from a base station or a controller UE, an indication to monitor the set of sidelink resources for the first portion of the one or more sensing windows.

Some examples of the method, apparatuses, and non-transitory computer-readable medium described herein may further include operations, features, means, or instructions for determining a monitoring pattern associated with monitoring the set of sidelink resources, the monitoring pattern indicating the first portion of the one or more sensing windows, the second portion of the one or more sensing windows, or a combination thereof.

DETAILED DESCRIPTION

Figure 1:
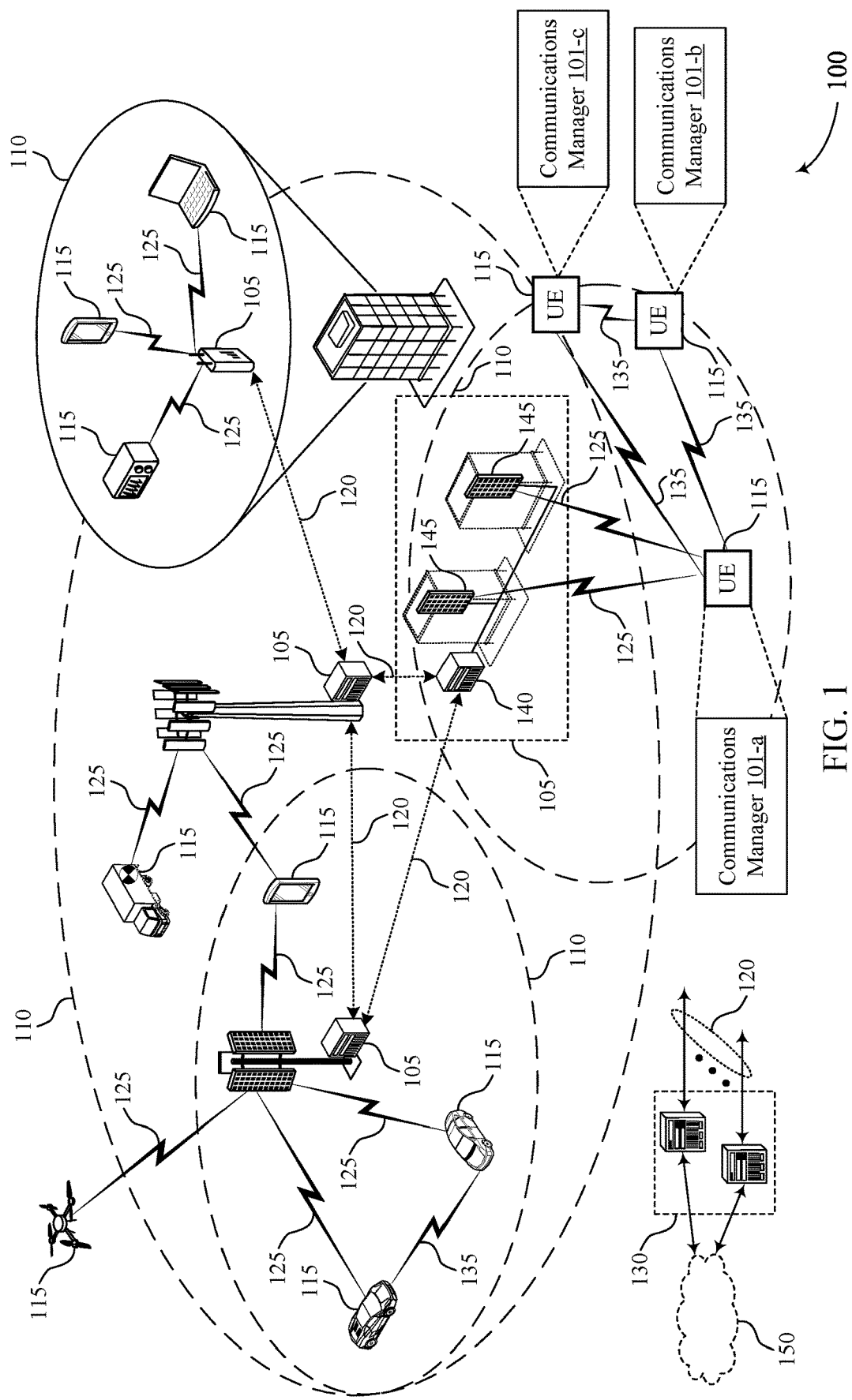
FIG. 1 illustrates an example of a wireless communications system that supports cooperative and coordinated sensing techniques for wireless communications systems in accordance with one or more aspects of the present disclosure.

Some wireless communications systems may support sidelink communications between multiple devices, such as user equipments (UEs). Such systems may support an assisted resource allocation mode (e.g., sidelink mode 1 resource allocation) in which a base station assists sidelink UEs in reserving resources. Additionally or alternatively, such systems may support an autonomous resource allocation mode (e.g., sidelink mode 2 resource allocation) in which sidelink UEs may autonomously select or reserve sidelink resources from a resource pool (e.g., without base station scheduling of the resources). In such cases, a UE may perform channel sensing in a set of sensing windows to determine available sidelink resources for selection from the resource pool. For example, the UE may select sidelink resources based on a result of the channel sensing and may transmit a sidelink message in the selected resources in a resource selection window. Additionally or alternatively, the UE may attempt to reserve sidelink resources (e.g., future resources) using the selected sidelink resources. For example, the UE may transmit signaling indicating a resource reservation to other UEs in the system. However, in some cases monitoring the set of sensing windows may be relatively inefficient. For example, each UE may be configured to monitor the set of sensing windows, which may result in relatively poor power efficiency, relatively high processing overhead, or both.

In accordance with the techniques described herein, wireless devices may implement cooperative and coordinated sensing techniques, which may improve power efficiency or reduce processing overhead while realizing a relatively low likelihood of interference. The wireless devices may monitor a set of sensing windows in accordance with a monitoring pattern. The wireless devices may monitor a portion of a sensing window, a subset of the sensing windows, or a combination thereof. In some examples, the wireless devices may indicate a result of such monitoring to other wireless devices, which may enable the devices in the system to maintain a relatively accurate resource map of a resource pool as described herein, in addition or alternative to realizing efficient power consumption due to refraining from monitoring other portions of the windows.

For example, a first UE may monitor a set of sidelink resources for a first portion of one or more sensing windows in accordance with a monitoring pattern. In some examples, monitoring resources may include sensing the resources as described herein. In some examples, the first UE may monitor portions of a single sensing window that are indicated by the monitoring pattern (e.g., the first UE may monitor a first portion of the sensing window and refrain from monitoring a second portion of the sensing window). Additionally or alternatively, the first UE may monitor a subset of the one or more sensing windows indicated by the monitoring pattern (e.g., the first UE may monitor a first sensing window and refrain from monitoring a second sensing window based on the monitoring pattern). The first UE may indicate a result of such monitoring to one or more other UEs. For example, the first UE may transmit control signaling indicating whether monitored resources (e.g., the first portion of the one or more sensing windows) are occupied or unoccupied. Additionally or alternatively, the control signaling may indicate a monitoring pattern associated with the first UE (e.g., the control signaling may indicate the first portion of the one or more sensing windows monitored by the first UE, a second portion of the one or more sensing windows not monitored by the first UE, or a combination thereof).

In some examples, the first UE may receive control signaling from the other UEs indicating respective monitoring results. For example, a second UE may indicate a result of monitoring at least a third portion of the one or more sensing windows (e.g., the second UE may monitor the third portion in accordance with a second monitoring pattern associated with the second UE). Additionally or alternatively, a third UE (e.g., a controller or cooperative UE) may indicate a result of monitoring at least a fourth portion of the one or more sensing windows. The first UE may determine a resource map based on the monitoring, the indicated results from other UEs, or a combination thereof. For example, the first UE may track occupied (e.g., reserved) resources detected via monitoring or indicated as occupied by another UE. By monitoring a portion of the one or more sensing windows (e.g., refraining from monitoring a second portion) and aggregating results of other portions monitored by other UEs, the first UE may be enabled with relatively accurate selection of resources while reducing a power consumption or processing overhead.

Aspects of the disclosure are initially described in the context of wireless communications systems. Aspects of the disclosure are described in the context of resource schemes and process flows. Aspects of the disclosure are further illustrated by and described with reference to apparatus diagrams, system diagrams, and flowcharts that relate to cooperative and coordinated sensing techniques for wireless communications systems.

FIG. 1 illustrates an example of a wireless communications system 100 that supports cooperative and coordinated sensing techniques for wireless communications systems in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, e.g., in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In accordance with the techniques described herein, wireless devices may implement cooperative and coordinated sensing techniques, which may improve power efficiency or reduce processing overhead while realizing a relatively low likelihood of interference. For example, a first UE 115 may monitor a set of sidelink resources for a first portion of one or more sensing windows in accordance with a monitoring pattern. In some examples, the first UE 115 may monitor portions of a sensing window indicated by the monitoring pattern (e.g., the first UE 115 may monitor a first portion of the sensing window and refrain from monitoring a second portion of the sensing window). Additionally or alternatively, the first UE 115 may monitor a subset of the one or more sensing windows indicated by the monitoring pattern (e.g., the first UE 115 may monitor a first sensing window and refrain from monitoring a second sensing window based on the monitoring pattern). The first UE 115 may indicate a result of such monitoring to one or more other UEs 115. For example, the first UE 115 may transmit control signaling indicating whether monitored resources (e.g., the first portion of the one or more sensing windows) are occupied or unoccupied. Additionally or alternatively, the control signaling may indicate a monitoring pattern associated with the first UE 115 (e.g., the control signaling may indicate the first portion of the one or more sensing windows monitored by the first UE 115, a second portion of the one or more sensing windows not monitored by the first UE 115, or a combination thereof). The first UE 115 may include a communications manager 101-a configured or otherwise enabling the first UE 115 to perform the various operations described herein.

In some examples, the first UE 115 may receive control signaling from the other UEs 115 indicating respective monitoring results. For example, a second UE 115 may indicate a result of monitoring at least a third portion of the one or more sensing windows (e.g., the second UE 115 may monitor the third portion in accordance with a second monitoring pattern associated with the second UE 115). Additionally or alternatively, a third UE 115 (e.g., a controller or cooperative UE 115) may indicate a result of monitoring at least a fourth portion of the one or more sensing windows. The first UE 115 may determine a resource map based on the monitoring, the indicated results from other UEs 115, or a combination thereof. For example, the first UE 115 may track occupied (e.g., reserved) resources detected via monitoring or indicated as occupied by another UE 115. By monitoring a portion of the one or more sensing windows (e.g., refraining from monitoring a second portion) and aggregating results of other portions monitored by other UEs 115, the UEs 115 may be enabled with relatively accurate selection of resources while reducing a power consumption or processing overhead. In some examples, one or more of the UEs 115 (e.g., the first UE 115, the second UE 115, the third UE 115) may include a respective communications manager 101 configured or otherwise enabling the UEs 115 to perform the various operations described herein. For example, the first UE 115 may include a communications manager 101-a, the second UE 115 may include a communications manager 101-b, and the third UE may include the communications manager 101-c. The communications managers 101 may be examples of communications managers as described with reference to FIGS. 8-11. In some examples, the UEs 115 may communicate via D2D communication links 135 as described herein.

Figure 2:
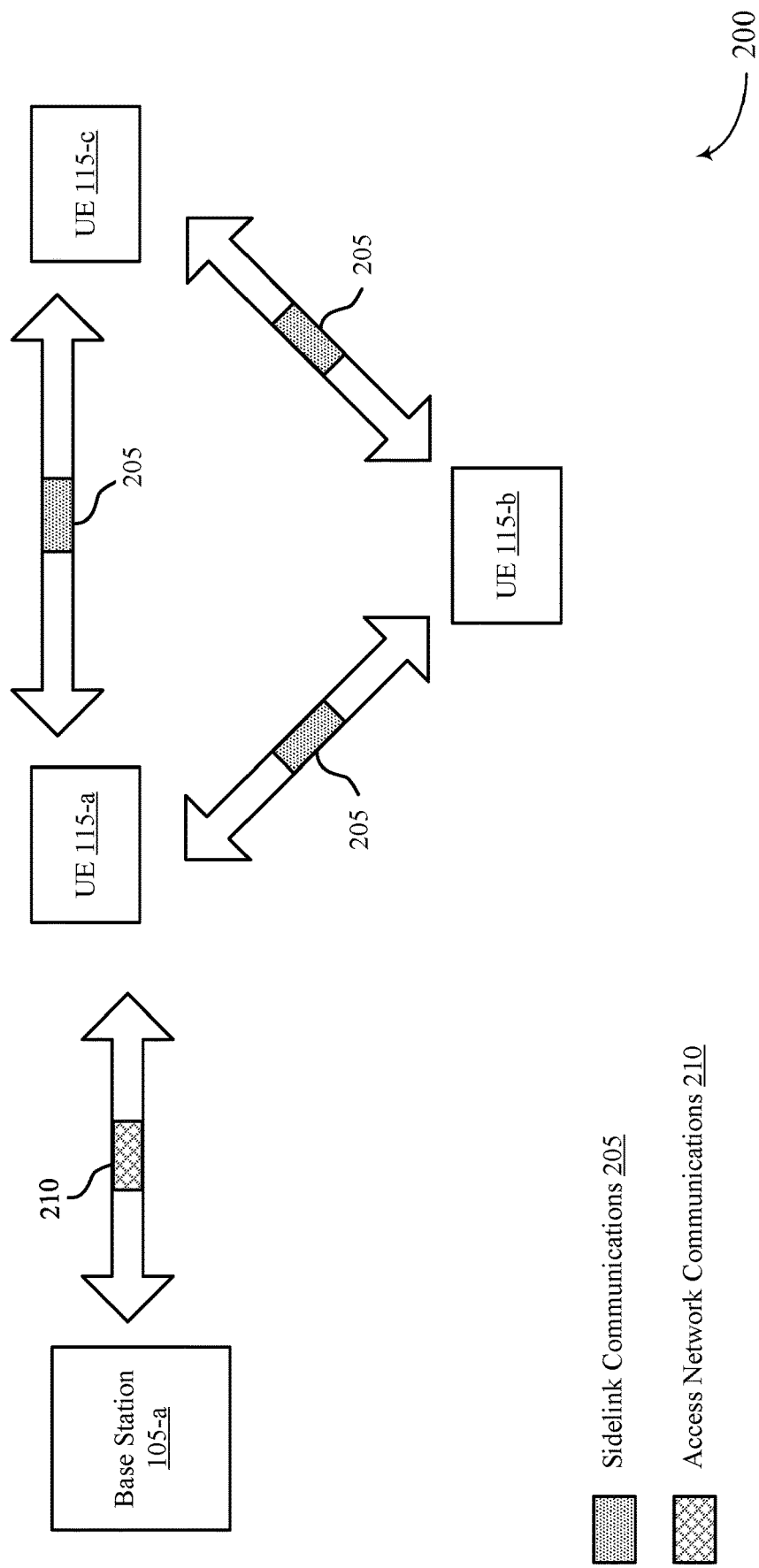
FIG. 2 illustrates an example of a wireless communications system that supports cooperative and coordinated sensing techniques for wireless communications systems in accordance with one or more aspects of the present disclosure.

FIG. 2 illustrates an example of a wireless communications system 200 that supports cooperative and coordinated sensing techniques for wireless communications systems in accordance with one or more aspects of the present disclosure. In some examples, the wireless communications system 200 may implement aspects of the wireless communications system 100. For example, the wireless communications system may include UE 115-a, UE 115-b, UE 115-c (e.g., among other UEs 115), a base station 105-a, or any combination thereof. The base station 105-a may communicate with the UEs 115 using access network communications 210. Additionally or alternatively, the UEs 115 may communicate with each other using sidelink communications 205.

The wireless communications system 200 may support an assisted resource allocation mode (e.g., sidelink mode 1 resource allocation) in which the base station 105-a assists sidelink UEs 115 in reserving resources. Additionally or alternatively, the wireless communications system 200 may support an autonomous resource allocation mode (e.g., sidelink mode 2 resource allocation) in which sidelink UEs 115 may autonomously select or reserve sidelink resources from a resource pool (e.g., without the base station 105-a scheduling the resources). In such cases, UEs 115 may perform channel sensing in a set of sensing windows to determine available sidelink resources for selection from the resource pool. For example, a first UE 115-a may select sidelink resources based on a result of the channel sensing and may transmit a sidelink message in the selected resources in a resource selection window. Additionally or alternatively, the UE 115-a may attempt to reserve sidelink resources (e.g., future resources) using the selected sidelink resources. For example, the UE 115-a may transmit signaling indicating a resource reservation to the UEs 115-b and 115-c using the sidelink communications 205 (e.g., sidelink control information may indicate the resource reservation of the sidelink resources the UE 115-a is reserving for subsequent or current communications).

As an illustrative example, the UE 115-a may monitor (e.g., sense) resources within a sliding sensing window. The UE 115-a may determine whether the resources are available for future communications (e.g., reservation by the first UE 115-a for sidelink communications 205) based on the monitoring. For example, the UE 115-a may sense signals on the resources and compare one or more metrics to a threshold. As an illustrative example, if received signals satisfy a reference signal received power (RSRP) threshold (e.g., are greater than the threshold), the UE 115-a may determine that the resources are occupied by other UEs 115 in the system and the resource are not available for reservation. Alternatively, if the received signals fail to satisfy the threshold (e.g., are less than the threshold), the UE 115-a may determine that the resource are not occupied. In other words, an availability check may be based on the RSRP level measured on physical sidelink control channel (PSCCH) or physical sidelink shared channel (PSSCH) demodulation reference signal (DMRS) according to a pre-configuration of the UE 115.

For example, an RSRP threshold (e.g., an RSRP comparison threshold) may be configuration per transmission priority and reception priority pair. As an illustrative example, the UE 115-b may have a packet for transmission to UE 115-c. The UE 115-b may have previously sensed a set of resources to obtain a resource map. For instance, the UE 115-b may determine which resources are occupied and which resources are unoccupied based on sensing a previous window, decoding sidelink control information (SCI) from the UE 115-a and the UE 115-c in the previous window, or a combination thereof. In some cases, the UE 115-b may attempt to reserve resources by checking an availability of the resources reserved by the UE 115-a and the UE 115-c. For example, the UE 115-b may compare a first metric (e.g., an RSRP associated with first resources reserved by the UE 115-*a* for communications to the UE 115-*b*) to a first threshold (e.g., an RSRP threshold configured for a reception priority and transmission priority for the communications between the UE 115-*b* and the UE 115-*a*). Additionally or alternatively, the UE 115-*b* may compare a second metric (e.g., an RSRP associated with second resources reserved by the UE 115-*c* for communications to the UE 115-*b*) to a second threshold (e.g., an RSRP threshold configured for a reception priority and transmission priority for the communications between the UE 115-*b* and the UE 115-*c*). The UE 115-*b* may determine whether the observed RSRP for a respective resource satisfies the threshold. As an example, if the RSRP is lower than a respective threshold, the UE 115-*b* may determine that the corresponding resource is available for reservation by the UE 115-*b* for the communication of the packet to the UE 115-*c*.

In some examples, the UE 115-*b* may select the resources for transmission of future communications (e.g., data, control information, packets, or other information) based on one or more of the sensing (e.g., monitoring) techniques described herein. For example, the UE 115-*a* may select resources to reserve (e.g., randomly) from the available (e.g., unoccupied) time-frequency resources in a resource pool. In some examples, the resource pool may be a set of resources associated with sidelink communications between the UEs 115 (e.g., the UEs 115 may communicate over a subset of the resources in the resource pool in accordance with the resource maps as described herein, for example, with reference to FIG. 3).

Additionally or alternatively, the UEs 115 may implement cooperative and coordinated sensing techniques as described herein, which may improve power efficiency or reduce processing overhead while realizing a relatively low likelihood of interference. For example, the UEs 115 may be configured to monitor portions of a set of monitoring windows in accordance with a monitoring pattern and indicate results of such monitoring with the other UEs 115. A UE 115 may combine resource maps of a set of resources using the monitored portions and the indicated results of the other UEs 115. Thus, the UE 115 may be enabled to refrain from monitoring at least a portion of the set of monitoring windows while maintaining a relatively accurate resource map of available and unavailable resources in the set of resources. Such techniques may result in one or more possible improvements. For example, some transmitting or receiving UEs 115 may be power sensitive and continuously monitoring the entire set of resources (e.g., each monitoring window of the set of resources) may result in relatively high power consumption. By sharing the sensing burden between multiple UEs 115 (e.g., some UEs 115 may monitor different or overlapping portions of one or more monitoring windows for the set of resources), a UE 115 may realize improved power efficiency while maintaining a relatively accurate resource map for resource reservation procedures.

As an illustrative example, the UE 115-*a* may monitor a set of sidelink resources for a first portion of one or more sensing windows in accordance with a monitoring pattern. The monitoring pattern may indicate the first portion of the one or more sensing windows for the UE 115-*a* to monitor, a second portion of the one or more sensing windows for the UE 115-*a* to refrain from monitoring (e.g., the UE 115-*a* may enter a low power mode during the second portion of the one or more sensing windows), or a combination thereof. In some examples, the monitoring pattern may indicate portions of a sensing window for the UE 115-*a* to monitor. For example, the monitoring pattern may indicate durations of time (e.g., slots, TTIs, and the like) of the sensing window that the UE 115-*a* is configured to monitor the set of resources, durations of time of the sensing window the UE 115-*a* is configured to refrain from monitoring the set of resources, or a combination thereof. Additionally or alternatively, the monitoring pattern may indicate a subset of sensing windows of the set of sensing windows that the UE 115-*a* is configured to monitor (i.e., the first portion of the one or more sensing windows may include the subset of sensing windows). For example, the monitoring pattern may indicate one or more sensing windows that the UE 115-*a* is configured to monitor the set of resources (e.g., the UE 115-*a* may monitor at least a first sensing window indicated by the pattern), one or more sensing windows that the UE 115-*a* is configured to refrain from monitoring the set of resources (e.g., the UE 115-*a* may not monitor for a second sensing window of the set of sensing windows), or a combination thereof.

The UE 115-*a* may determine the monitoring pattern based on a configuration of the UE 115-*a*. In some examples, the UE 115-*a* may be pre-configured with the monitoring pattern. Additionally or alternatively, the UE 115-*a* may receive signaling indicating the monitoring pattern, such as control information from a controller UE 115 or the base station 105-*a* (e.g., the pattern may be indicated via sidelink control information messages, downlink control information messages, radio resource control (RRC) messages, medium access control (MAC) control element (CE) messages, or any combination thereof). In some examples, a receiving UE 115 may generate a first monitoring pattern for the receiving UE 115 and a second monitoring pattern for the transmitting UE 115. The receiving UE 115 may indicate the second monitoring pattern to the transmitting UE 115 in addition or alternative to other monitoring patterns associated with other UEs 115. In such examples, UEs 115 may determine whether each portion (e.g., duration, window, or a combination thereof) of the set of monitoring windows is monitored by a sole node, multiple nodes, or no nodes, and resource selection may be performed based on the determination. As one example, if sensing is split per sensing window (e.g., a sensing window is divided into one or more portions to monitor or refrain from monitoring), the receiving UE 115 (or a monitoring UE 115) may share (e.g., indicate) a set of lengths (e.g., time durations represented as $L_1, L_2, \ldots L_C$ where C represents the number of cooperating nodes in the system). The lengths may indicate a duration a respective UE 115 monitors a sensing window. The node may additionally or alternatively indicate a start of the monitoring duration in the window, an end of the monitoring duration in the window, or a combination thereof. Such parameters (e.g., lengths, start and end of windows, or a combination thereof for one or more UEs 115) may be signaled, pre-configured, or configured using RRC or MAC-CE messaging (e.g., by the base station 105-*a* or a controller node, which may in some examples be referred to as a coordinating node or a controller UE 115).

In some examples, each UE 115 may generate a respective monitoring pattern (e.g., the UE 115-*a* may generate a first monitoring pattern implemented by the UE 115-*a*, the UE 115-*b* may generate a second monitoring pattern implement by the UE 115-*b*, and so on). In some examples, a controller UE 115 (or a base station 105) may generate a set of monitoring patterns and indicate a respective pattern of the set of monitoring patterns to each UE 115 (e.g., the controller UE 115 may generate a monitoring pattern for the UE 115-*a* and indicate the monitoring pattern to the UE 115-*a*).

In some examples, the pattern may include a sequence of bits. In some such examples, each bit in the sequence of bits may indicate whether to monitor a respective sensing window or a respective portion of a sensing window. For example, a bit of the sequence may be associated with an index of a sensing window (e.g., a second bit of the sequence may correspond to a second sensing window in a set of windows) or an index of a duration in a sensing window (e.g., a third bit of the sequence may correspond to a third TTI or slot of a sensing window, in addition or alternative to a third TTI or slot in other sensing windows) or a combination thereof. A first bit value (e.g., 0) may indicate that the UE 115-a does not perform sensing for a corresponding sensing window or duration. A second bit value (e.g., 1) may indicate that the UE 115-a performs sensing for a corresponding sensing window or duration.

In some examples, a node (e.g., a controller UE 115, a base station 105-a, a receiving UE 115, a transmitting UE 115, or other nodes) may generate a sequence of bits randomly. As one example, the UE 115-a may generate one or more patterns of Bernoulli random variables, where the UE 115-a uses a first pattern in addition or alternative to other UEs 115 using respective patterns of the one or more patterns (e.g., the UE 115-a may generate a respective pattern for each UE 115). In some other examples, the node may be pre-configured with the pattern or may determine a pattern based one or more parameters. For example, the node may generate a first sequence of bits for a first UE 115 and a second sequence of bits for a second UE 115 such that the UEs 115 alternate sensing durations or windows (e.g., the first pattern may be a sequence of 0, 0, 1, 1, and the second pattern may be a sequence of 1, 1, 0, 0), although other configurations may be implemented. For example, a UE 115 with relatively low power capabilities may be assigned a pattern with a smaller duration to monitor compared to a UE 115 with relatively high power capabilities, different patterns may be configured to overlap monitored or non-monitored portions, among other examples.

In some examples, a UE 115 may be referred to as a controlling UE 115 or a controller UE 115. For example, the UE 115-a may identify a controller UE 115. In some examples, the UE 115-a may determine that the UE 115-b is the controller based on the UE 115-b being a receiving UE 115 for a message (e.g., a target UE 115 for a unicast message). Additionally or alternatively, the base station 105-a may indicate the controller UE 115 to the UE 115-a using control signaling, or UEs 115 in the system may coordinate and agree on which UE 115 is the controller. In some examples, the controller UE 115 may generate the monitoring patterns for one or more other UEs 115 or may configure other UEs 115 to generate their own monitoring patterns.

In some examples, the UEs 115 may indicate one or more results of monitoring procedures to other UEs 115. For example, the UE 115-a may perform sensing of a set of resources in accordance with a monitoring pattern associated with the UE 115-a. The UE 115-a may update a resource map based on the sensing as described herein. For example, the UE 115-a may determine whether monitored portions of the resources are occupied based on a result of a sensing operation (e.g., if sensed signals satisfy one or more thresholds). In some examples, the UE 115-a may transmit signaling (e.g., control signaling) indicating the result. For example, the UE 115-a may indicate resources that were detected as occupied, resources that were detected as unoccupied, or a combination thereof. Additionally or alternatively, the UE 115-a may indicate the monitored first portion of the one or more sensing windows or the unmonitored second portion (e.g., the UE 115-a may indicate the sensing pattern or otherwise indicate the windows, durations, or both that the UE 115-a monitored in accordance with the sensing pattern).

In some examples, the UE 115-a may receive control signaling from one or more UEs 115 indicating results of the UEs 115 monitoring respective portions of the one or more sensing windows. For example, the UE 115-b may monitor a third portion of the one or more sensing windows in accordance with a same or different monitoring pattern associated with the UE 115-b. The UE 115-b may indicate a result of monitoring the third portion to the UE 115-a. In some examples, the third portion includes one or more sensing windows of the set of sensing windows, one or more durations within the one or more sensing windows, or any combination thereof. In some examples, the UE 115-b may indicate the third portion (e.g., the UE 115-b may indicate the sensing pattern or otherwise indicate the windows, durations, or both that the UE 115-b monitored in accordance with the sensing pattern). In some other examples, the UE 115-a may determine the third portion based on signaling from a controller UE 115 (e.g., another node may generate the patterns and broadcast the patterns such that each node is aware of the other nodes patterns).

The UE 115-a may update a resource map based on sensing at the UE 115-a in addition or alternative to receiving the one or more results of other UEs 115. In some examples, the UE 115-a may reserve resources independently. For example, the UE 115-a may rely on its own resource map of occupied and unoccupied resources to select available resources. In some other examples, the UE 115-a may reserve resources in a coordinated manner (e.g., the UEs 115 may make coordinated decisions in resource reservations). In such examples, UEs 115 may share results of monitoring with each other and the UE 115-a may update the resource map based on the indicated results. For example, if the UE 115-b indicates that a subset of the resources is occupied, the UE 115-a may refrain from including the subset of the resources in an available set of resources. In some cases, if the UE 115-b indicates that a subset of resources was not monitored, the UE 115-b may interpret those resources as being empty (e.g., not occupied). Thus, the UE 115-a may select resources (e.g., even if the UE 115-a did not perform any sensing in all or portions of the sensing windows in order to conserve power) using a relatively accurate resource map. In some examples, a feature for making such coordinated decisions may be enabled or disabled (e.g., a parameter in control signaling may indicate whether UEs 115 share results or reserve resources independently).

Figure 3:
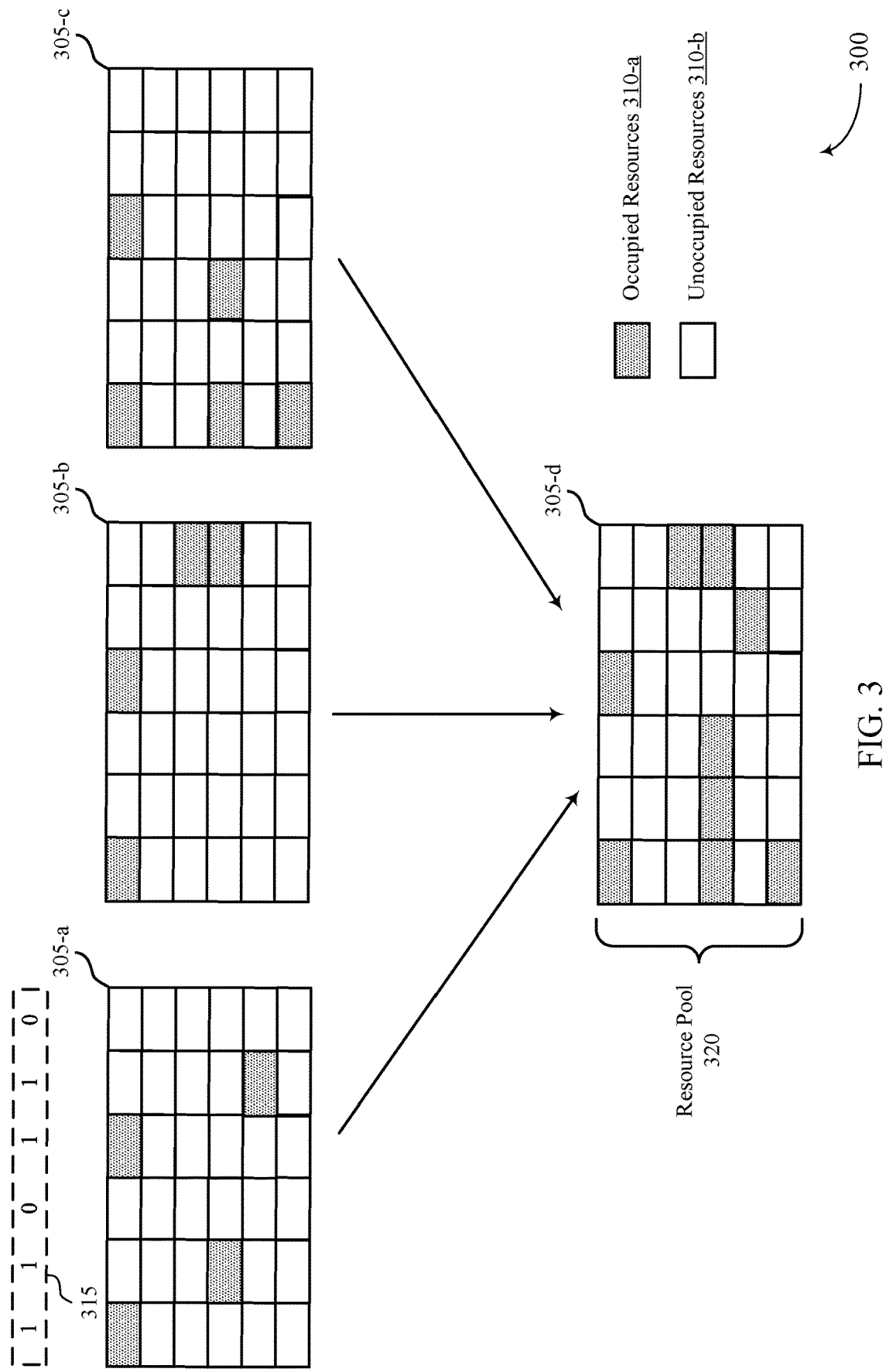
FIGS. 3-6 illustrate examples of sensing schemes that supports cooperative and coordinated sensing techniques for wireless communications systems in accordance with one or more aspects of the present disclosure.

FIG. 3 illustrates an example of a sensing scheme 300 that supports cooperative and coordinated sensing techniques for wireless communications systems in accordance with one or more aspects of the present disclosure. The sensing scheme 300 may implement aspects of the wireless communications system 100 and 200. For example, the sensing scheme 300 may illustrate a procedure performed by UEs for updating a resource map, which may be an example of corresponding devices as described herein with reference to FIGS. 1 and 2. In some examples, a resource map 305 may be referred to as or include a resource pool 320 (e.g., the resource map 305 may indicate occupied or unoccupied resources of a resource pool 320).

A first UE may obtain a first resource map 305-a. For example, the resource map 305-a may represent a set of time frequency resources (e.g., a resource pool 320) of a sensing window. The first UE may monitor a first portion of the sensing window in accordance with a monitoring pattern 315 (e.g., the first UE may monitor the first two TTIs, a third TTI, and a fourth TTI based on the monitoring pattern indicating to monitor the TTIs). For example, the monitoring pattern 315 may be an example of a monitoring pattern as described herein with reference to FIG. 2. Although a single sensing window is shown for illustrative clarity, any quantity of sensing windows or configuration may be implemented, for example, as described with reference to FIG. 2. The first UE may determine whether the resources of the resource pool are occupied or unoccupied based on the monitoring. For example, the first UE may determine one or more occupied resources 310-a, unoccupied resources 310-b, or any combination thereof and update the resource map 305-a to indicate the occupied resources 310-a of the resource pool (e.g., the resource map 305-a may indicate the occupied resources 310-a, unoccupied resources 310-b, or a combination thereof of the resource pool illustrated by the resource map 305-a). In some examples, portions of the sensing window not monitored by the first UE may be considered or indicated as unoccupied resources 310-b.

The first UE may receive an indication of resource maps 305-b and 305-c. In some cases, each resource map 305 may illustrate a mapping of occupied and unoccupied resources of a same resource pool 320. For example, a second UE (e.g., a receiving UE the first UE intends to transmit communications to) may determine a resource map 305-b by monitoring in accordance with a respective monitoring pattern (e.g., a different monitoring pattern than the monitoring pattern 315, the different monitoring pattern indicating the first TTI, the fourth TTI, and the sixth TTI, although any such monitoring pattern may be used). The second UE may indicate the resource map 305-b to the first UE. Additionally or alternatively, a third UE (e.g., a coordinating UE assisting sensing for the set of resources that may or may not have data communications with the first UE and the second UE) may determine the resource map 305-b by monitoring the resource in accordance with a respective monitoring pattern associated with the third UE (not shown). The third UE may indicate the resource map 305-c to one or both of the first UE and the second UE.

The first UE may obtain a resource map 305-d based on the monitoring, the received results of the other UEs monitoring, or a combination thereof. In some examples, the first UE may reserve resource independently and use the resource map 305-a for selection of resources from the unoccupied resources 310-b. In some other examples, the first UE may aggregate the results of the resource map 305-a with the resource maps 305-b and/or the resource map 305-c. For example, the resource map may generate the resource map 305-d by combining the results of each of the monitoring procedures for the first, second, and third UEs. In such examples, the first UE may select resources for reservation from the resource map 305-d.

Figure 4A:
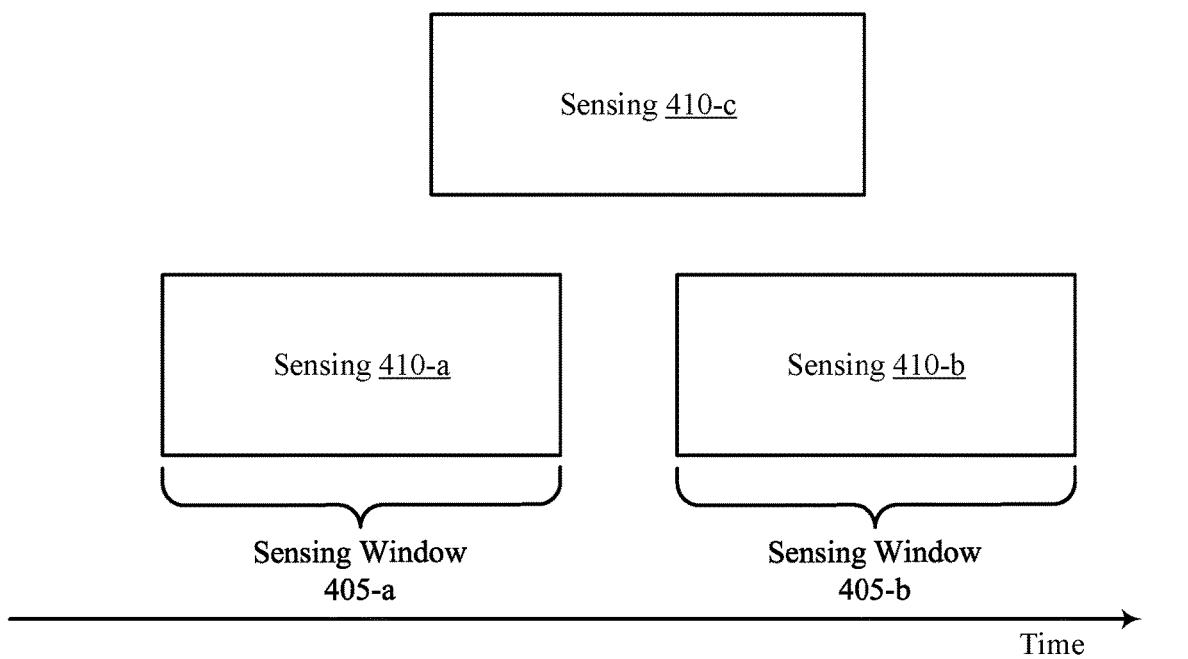
Figure 4B:
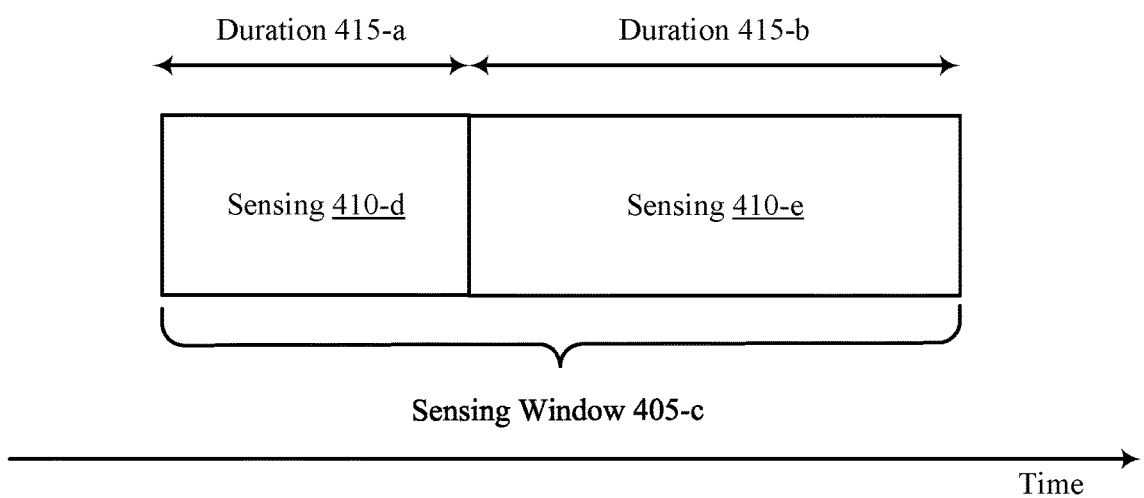

FIGS. 4A and 4B illustrate examples of sensing schemes 400 and 401 that support cooperative and coordinated sensing techniques for wireless communications systems in accordance with one or more aspects of the present disclosure. The sensing schemes 400 and 401 may implement aspects of the wireless communications systems 100 or 200 or the sensing scheme 300. For example, the sensing schemes 400 and 401 may illustrate sensing (e.g., monitoring) performed by UEs in accordance with a monitoring pattern, which may examples of the corresponding devices as described herein with reference to FIGS. 1 and 2.

The sensing scheme 400 shows an example scheme for a first UE, a second UE, or other UEs to monitor sensing windows 405-a and 405-b in accordance with one or more monitoring patterns. For example, a first UE may perform sensing 410-a for the sensing window 405-a (e.g., a transmitting UE may perform a sensing task as described with reference to FIG. 2). As an illustrative example, the monitoring pattern for the first UE may include an indication to monitor the sensing window 405-a (e.g., a bit value of 1 for a bit corresponding to the sensing window 405-a).

Additionally or alternatively, a second UE may perform sensing 410-b for the sensing window 405-b (e.g., a receiving UE may perform a sensing task as described with reference to FIG. 2). As an illustrative example, the monitoring pattern for the second UE may include an indication to monitor the sensing window 405-b (e.g., a bit value of 1 for a bit corresponding to the sensing window 405-b).

In some examples, the first UE may refrain from performing sensing 410-b for the sensing window 405-b, the second UE may refrain from performing sensing 410-a for the sensing window 405-a, or a combination thereof. In some other examples, the first UE, the second UE, or both may perform sensing 410 for both sensing windows 405 or for an overlapping portion of the sensing windows 405. As one illustrative example, both the first UE and the second UE may perform sensing 410-c for a portion of the sensing window 405-a and the sensing window 405-b. Additionally or alternatively, one or more additional UEs (e.g., cooperating UEs such as a third UE) may perform sensing alternative or concurrent with the first and second UEs. For example, a third UE may perform sensing 410-c, 410-a, 410-b, or any combination thereof. The UEs may indicate results of such sensing 410 as described with reference to FIG. 2.

The sensing scheme 401 shows an example of monitoring portions of a single sensing window 405-c. For example, a first UE may perform sensing 410-d for duration 415-a of the sensing window 405-c based on a monitoring pattern (e.g., the monitoring pattern may indicate one or more TTIs of the duration 415-a). Additionally or alternatively, a second UE may perform sensing 410-e for duration 415-b of the sensing window 405-c based on a monitoring pattern (e.g., the monitoring pattern may indicate one or more TTIs of the duration 415-b). In some examples, other UEs (e.g., cooperative nodes such as the third UE) may monitor for one or more portions of the sensing window 405-c. Although shown as separate for illustrative clarity, the durations 415 associated with each UE may be different sizes, different orders, overlap with one another, different quantities of durations and corresponding sensing operations may be implemented, or any combination thereof. In some examples, aspects of the sensing schemes 400 and 401 may be combined.

Figure 5:
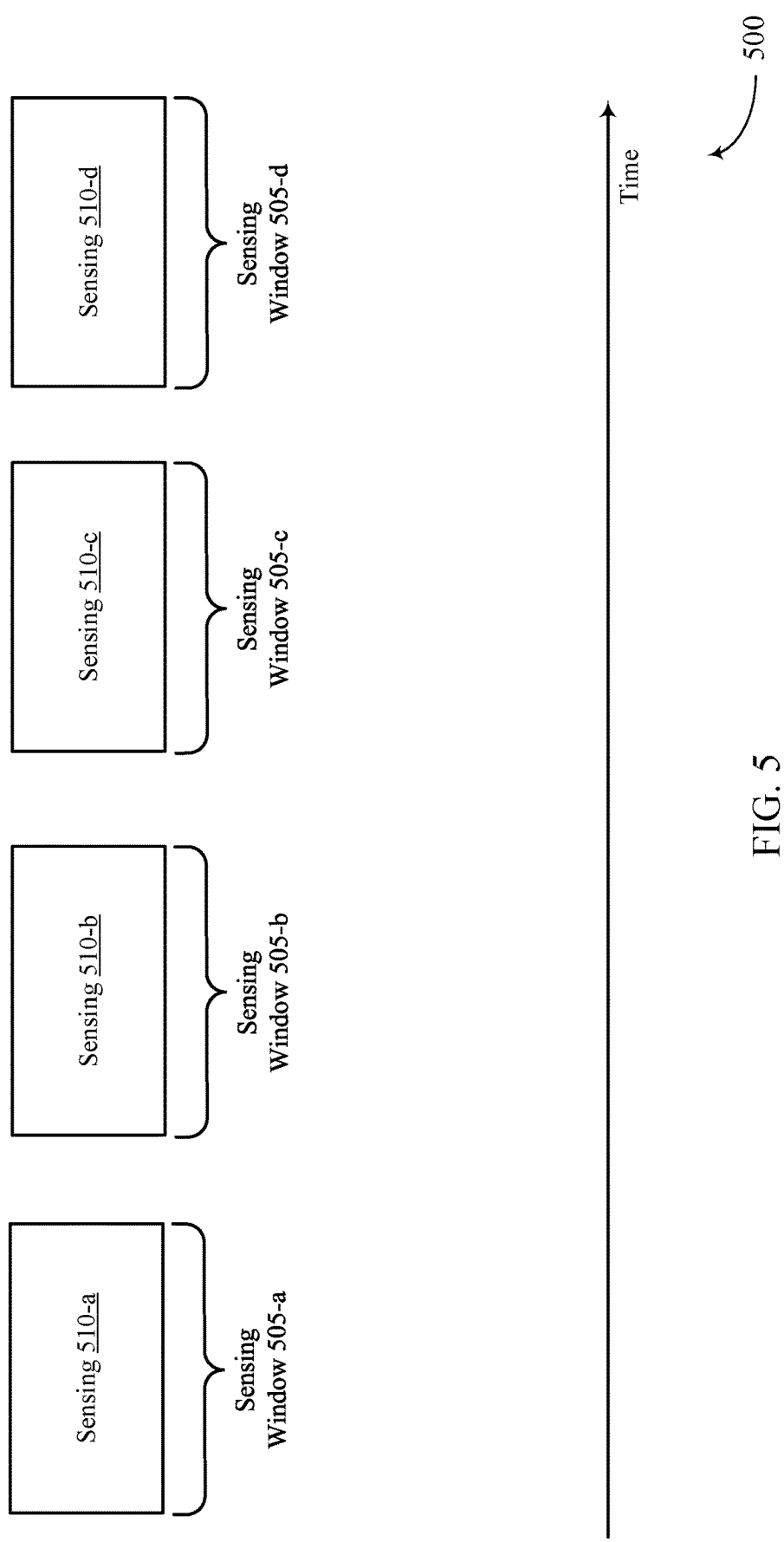

FIG. 5 illustrates an example of a sensing scheme 500 that supports cooperative and coordinated sensing techniques for wireless communications systems in accordance with one or more aspects of the present disclosure. The sensing scheme 500 may implement aspects of the wireless communications systems 100 or 200 or the sensing schemes 300, 400, or 401. For example, the sensing scheme 500 may illustrate sensing (e.g., monitoring) of entire sensing windows 505 performed by UEs in accordance with a monitoring pattern, which may examples of the corresponding devices as described herein with reference to FIGS. 1-4.

The sensing scheme 500 shows an example scheme for a first UE, a second UE, or other UEs to monitor sensing windows 505 in accordance with one or more monitoring patterns. For example, a first UE may perform sensing 510-*a* for the sensing window 505-*a*, a second UE may perform sensing 510-*b* for sensing window 505-*b*, no UEs may perform sensing 510-*c* for the sensing window 505-*c* (e.g., the sensing window 505-*c* may be indicated as unoccupied), and both UEs may perform sensing 510-*d* for the sensing window 505-*d*. Such windows and sensing may be examples of the corresponding elements and operations as described herein with reference to FIGS. 1-4.

Although shown as four sensing windows 505 for illustrative clarity, the quantity of sensing windows 505 may be different, the monitoring patterns may be different (e.g., the UEs may monitor different sensing windows 505 or portions of the sensing windows 505), or any combination thereof. Additionally or alternatively, other UEs may perform sensing and share results of such sensing as described herein.

Figure 6:
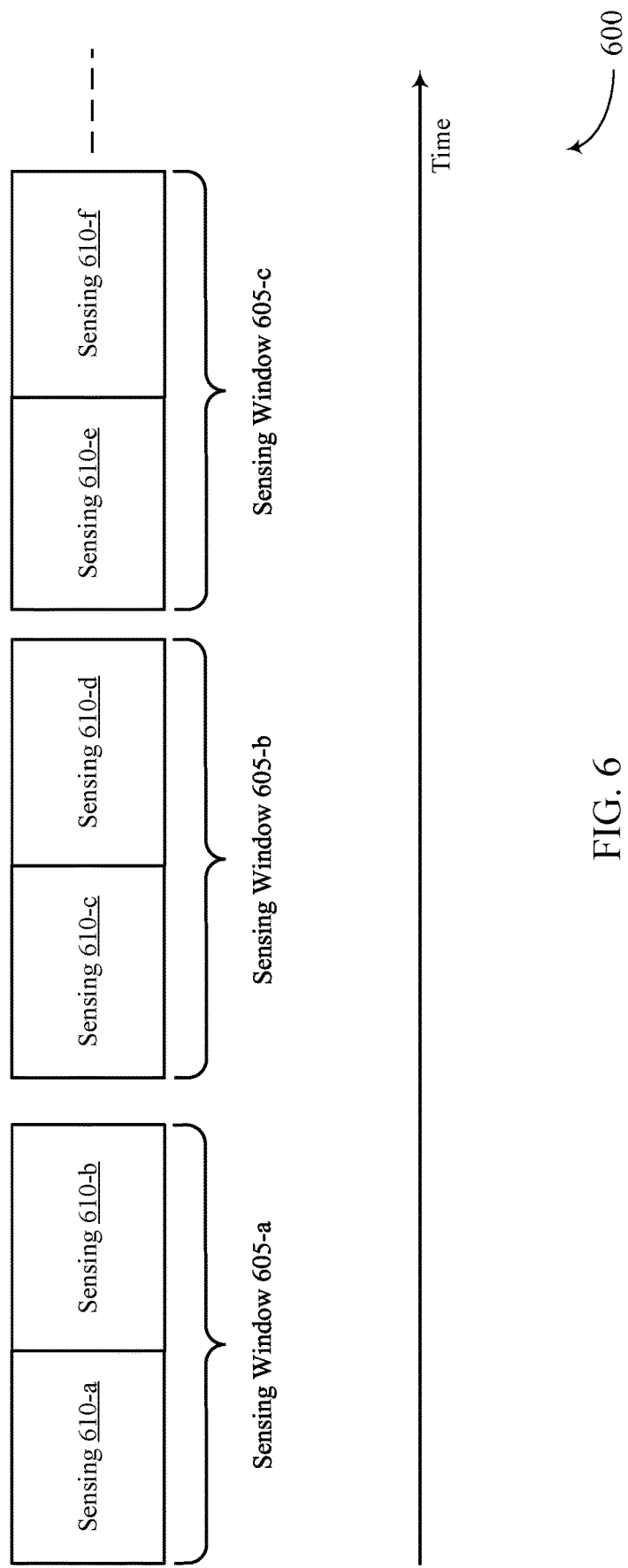

FIG. 6 illustrates an example of a sensing scheme 600 that supports cooperative and coordinated sensing techniques for wireless communications systems in accordance with one or more aspects of the present disclosure. The sensing scheme 600 may implement aspects of the wireless communications systems 100 or 200 or the sensing schemes 300,400, 401, or 500. For example, the sensing scheme 600 may illustrate sensing (e.g., monitoring) of partial sensing windows 505 performed by UEs in accordance with a monitoring pattern, which may examples of the corresponding devices as described herein with reference to FIGS. 1-5.

The sensing scheme 600 shows an example scheme for a first UE, a second UE, or other UEs to monitor sensing windows 605 in accordance with one or more monitoring patterns. As an illustrative example, a first UE may perform sensing 610-*a* for the sensing window 605-*a* and a second UE may perform sensing 610-*b* for the sensing window 605-*a*. No UEs may perform sensing 610-*c* for the sensing window 605-*b* and the second UE may perform sensing 610-*d* for the sensing window 605-*b*. The first UE may perform sensing 610-*e* for the sensing window 605-*c* and no UEs may perform sensing 610-*f* for the sensing window 605-*c*. Such windows and sensing may be examples of the corresponding elements and operations as described herein with reference to FIGS. 1-4. For example, the monitoring (e.g., sensing 610) operations may be performed in accordance with one or more monitoring patterns as described herein with reference to FIG. 2.

Although shown as three sensing windows 605 for illustrative clarity, the quantity of sensing windows 605 may be different, the monitoring patterns may be different (e.g., the UEs may monitor different sensing windows 605 or portions of the sensing windows 605), or any combination thereof. Additionally or alternatively, other UEs (e.g., a third UE) may perform sensing and share results of such sensing as described herein.

Figure 7:
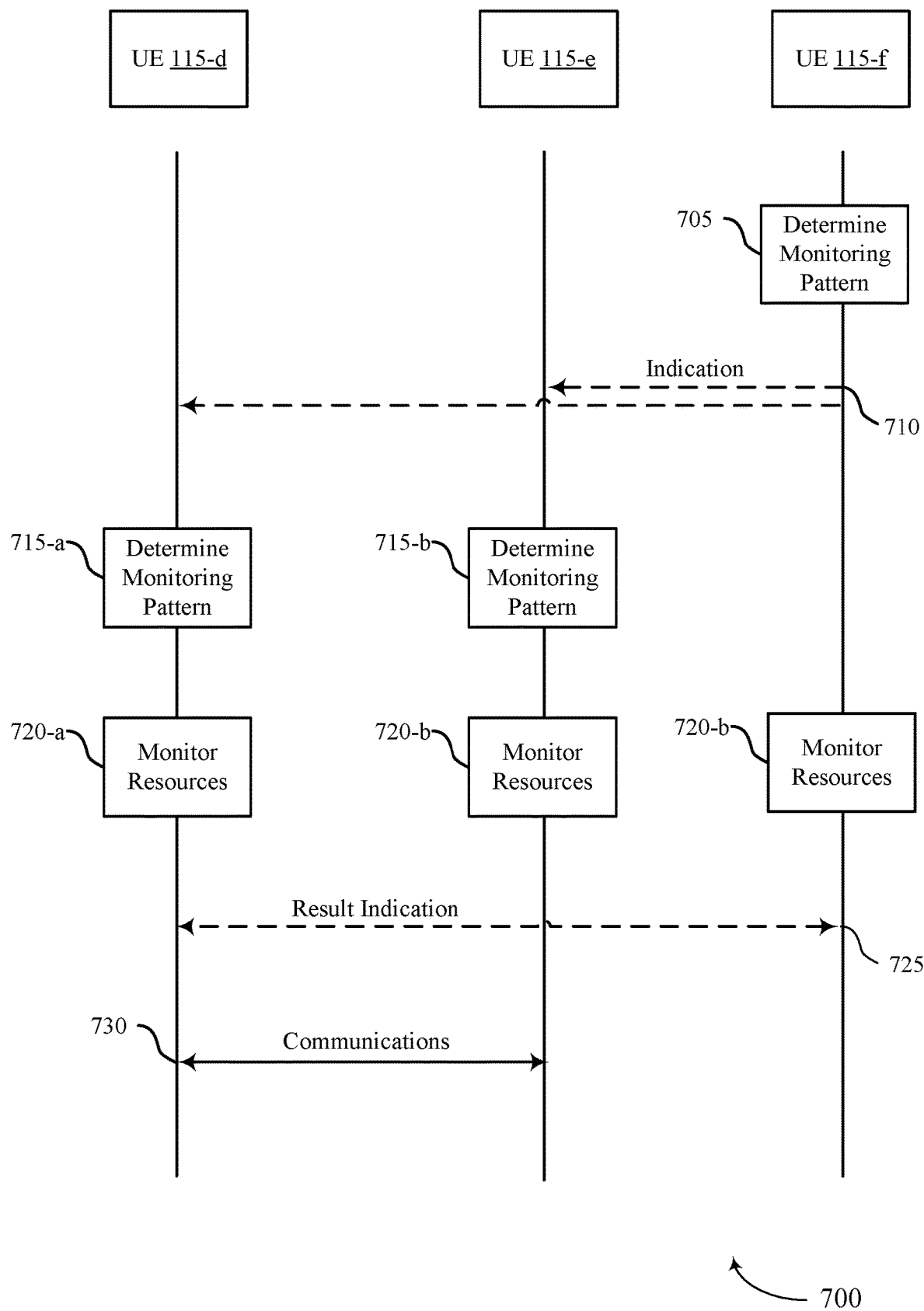
FIG. 7 illustrates an example of a process flow that supports cooperative and coordinated sensing techniques for wireless communications systems in accordance with one or more aspects of the present disclosure.

FIG. 7 illustrates an example of a process flow 700 that supports cooperative and coordinated sensing techniques for wireless communications systems in accordance with one or more aspects of the present disclosure. The process flow 700 may implement or be implemented by aspects of the wireless communications systems 100 or 200, or sensing schemes 300, 400, 401, 500, or 600. For example, process flow 700 may be implemented by UEs 115-*d*, 115-*e*, and 115-*f*, which may be examples of UEs as described with reference to FIGS. 1 through 6. In the following description of the process flow 700, the operations may be performed in a different order than the order shown, or the operations performed by UEs 115 may be performed in different orders or at different times. For example, operations may also be left out of the process flow 700, or other operations may be added to the process flow 700. Although UEs 115-*d*, 115-*e*, and 115-*f* are shown performing the operations of the process flow 700, some aspects of some operations may also be performed by one or more other wireless devices.

At 705, the UE 115-*f* may determine one or more monitoring patterns. For example, the UE 115-*f* may be an example of a cooperative UE or a controller UE (e.g., a third UE) as described herein. In some examples, the UE 115-*f* may determine a monitoring pattern for the UE 115-*f* Additionally or alternatively, the UE 115-*f* may determine monitoring patterns for the UE 115-*d* and the UE 115-*e*.

In some examples, at 710 the UE 115-*f* may indicate the determined monitoring patterns to the UEs 115-*d* and 115-*e*. For example, the UE 115-*f* may be a controller UE and may generate a monitoring pattern for each UE 115 and indicate the patterns to the UEs 115 as described herein with reference to FIG. 2.

At 715-*a* and 715-*b*, the UE 115-*d* and the UE 115-*e* may determine a respective monitoring pattern. For example, the UE 115-*d* (e.g., a first UE) may determine a monitoring pattern for monitoring a first portion of one or more sensing windows as described herein. Additionally or alternatively, the UE 115-*e* may determine a second monitoring pattern for monitoring another portion of the one or more sensing windows as described herein. In some examples, the UEs 115 may generate respective monitoring patterns. In some other examples, the UEs 115 may receive indications of the monitoring patterns from other UEs 115 (e.g., the UE 115-*f*, the UE 115-*e*, or the UE 115-*d*).

At 720, one or more UEs 115 may monitor resources in accordance with a respective monitoring pattern. For example, at 720-*a* the UE 115-*d* may monitor a set of resources for the first portion of the one or more sensing windows indicated by the respective monitoring pattern for the UE 115-*d*. Additionally or alternatively, at 720-*b* the UE 115-*e* may monitor the set of resources for another portion (e.g., a different, same, or overlapping portion) of the one or more sensing windows indicated by the respective monitoring pattern for the UE 115-*e*. Additionally or alternatively, at 720-*c* the UE 115-*f* may monitor the set of resources for another portion (e.g., a different, same, or overlapping portion) of the one or more sensing windows indicated by the respective monitoring pattern for the UE 115-*f*.

In some examples, at 725 the UEs 115 may indicate one or more results of monitoring the resources. For example, the UE 115-*d* may transmit control signaling indicating a result of the monitoring the first portion of the one or more sensing windows to one or both of the UEs 115-*e* and 115-*f*. At 730, the UE 115-*d* and the UE 115-*e* may exchange communications. For example, the UE 115-*d* may reserve resources for transmission of data to the UE 115-*e* based on the monitoring, the result indications from the UEs 115-*e* or 115-*f*, or a combination thereof. The UE 115-*d* may transmit data via the reserved resources.

Figure 8:
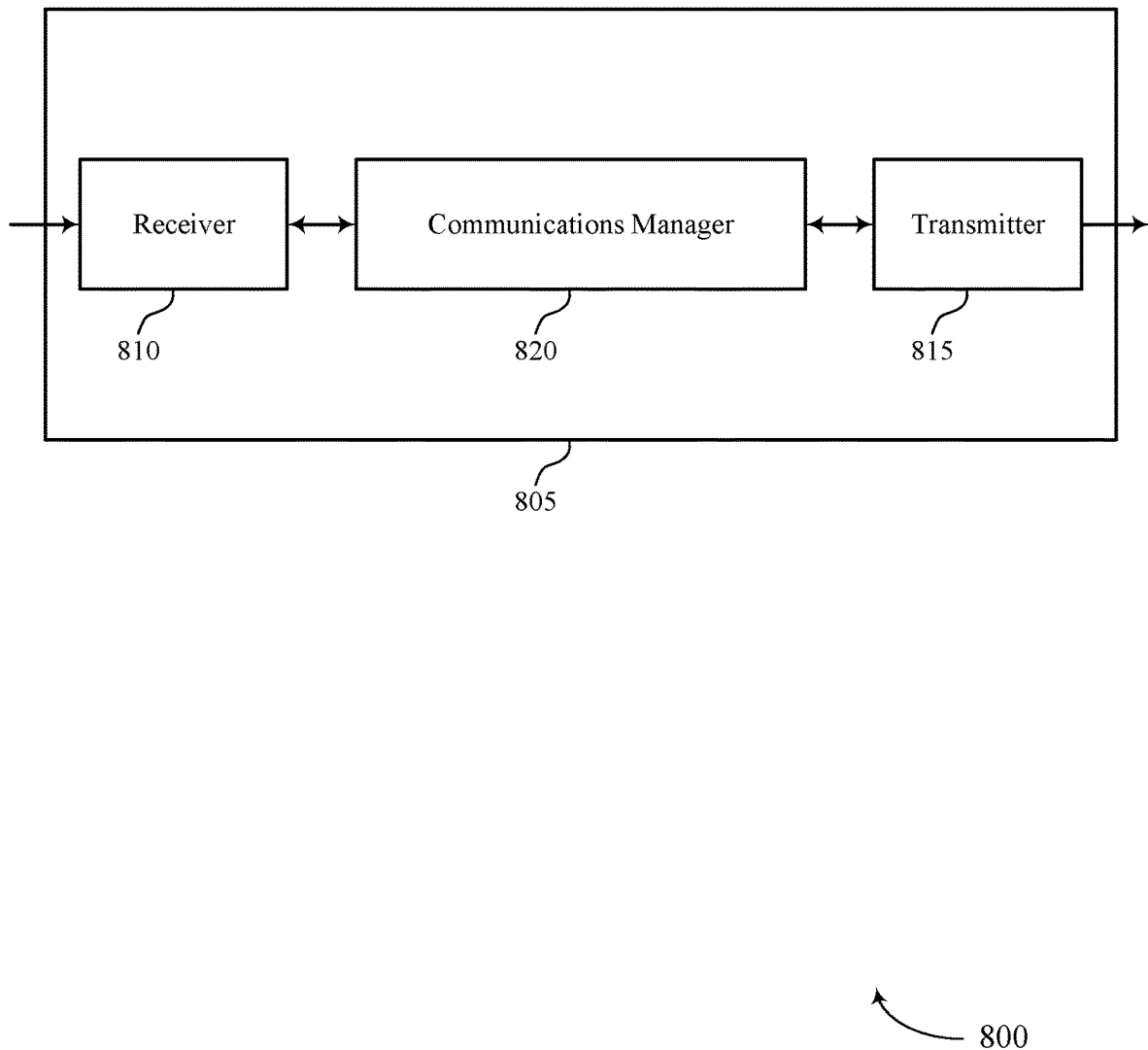
FIGS. 8 and 9 show block diagrams of devices that support cooperative and coordinated sensing techniques for wireless communications systems in accordance with one or more aspects of the present disclosure.

FIG. 8 shows a block diagram 800 of a device 805 that supports cooperative and coordinated sensing techniques for wireless communications systems in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to cooperative and coordinated sensing techniques for wireless communications systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to cooperative and coordinated sensing techniques for wireless communications systems). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of cooperative and coordinated sensing techniques for wireless communications systems as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. For example, the communications manager 820 may be configured as or otherwise support a means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. The communications manager 820 may be configured as or otherwise support a means for transmitting, to one or more UEs, control signaling indicating a result of monitoring the set of sidelink resources for the first portion of the one or more sensing windows in accordance with the monitoring pattern. The communications manager 820 may be configured as or otherwise support a means for transmitting data to at least a second UE based on transmitting the control signaling.

Additionally or alternatively, the communications manager 820 may support wireless communications at a second UE in accordance with examples as disclosed herein. For example, the communications manager 820 may be configured as or otherwise support a means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. The communications manager 820 may be configured as or otherwise support a means for transmitting, to one or more UEs, control signaling indicating a result of monitoring the set of sidelink resources for the first portion of the one or more sensing windows in accordance with the monitoring pattern. The communications manager 820 may be configured as or otherwise support a means for receiving data from at least a first UE based on transmitting the control signaling.

Additionally or alternatively, the communications manager 820 may support wireless communications at a third UE in accordance with examples as disclosed herein. For example, the communications manager 820 may be configured as or otherwise support a means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. The communications manager 820 may be configured as or otherwise support a means for transmitting, to at least a first UE and a second UE, control signaling indicating a result of monitoring the set of sidelink resources for the first portion of the one or more sensing windows in accordance with the monitoring pattern.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for sensing as described herein. For example, the device 805 may be enabled to monitor a portion of one or more sensing windows (e.g., partially monitor a sensing window, alternate monitoring sensing windows) as described herein. Such techniques may result in improved power efficiency at the device 805 (e.g., the device 805 may be able to refrain from monitoring at least a portion of the sensing windows, which may result in reduced power or processing).

Figure 9:
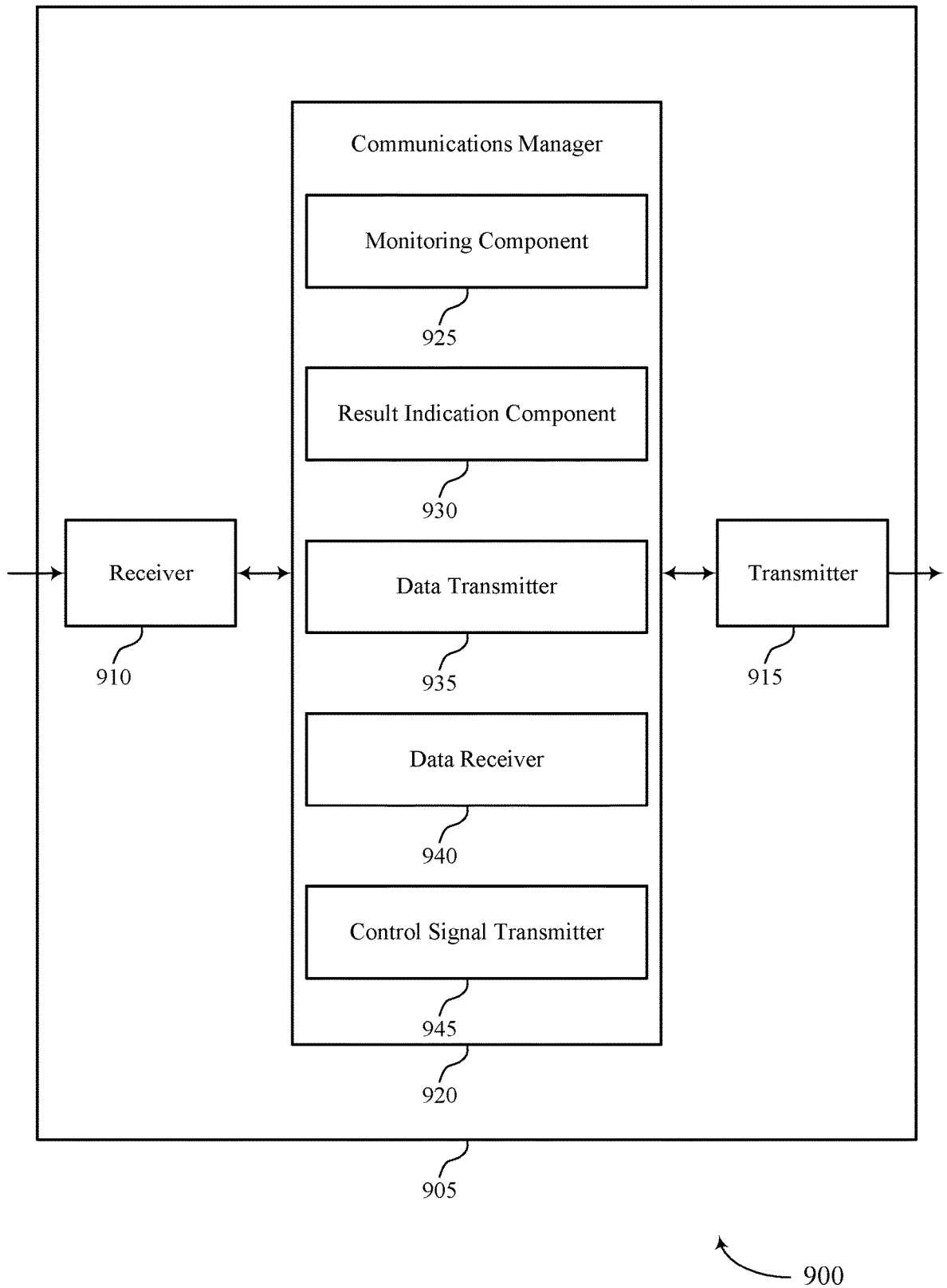

FIG. 9 shows a block diagram 900 of a device 905 that supports cooperative and coordinated sensing techniques for wireless communications systems in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to cooperative and coordinated sensing techniques for wireless communications systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to cooperative and coordinated sensing techniques for wireless communications systems). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of cooperative and coordinated sensing techniques for wireless communications systems as described herein. For example, the communications manager 920 may include a monitoring component 925, a result indication component 930, a data transmitter 935, a data receiver 940, a control signal transmitter 945, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first UE in accordance with examples as disclosed herein. The monitoring component 925 may be configured as or otherwise support a means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. The result indication component 930 may be configured as or otherwise support a means for transmitting, to one or more UEs, control signaling indicating a result of monitoring the set of sidelink resources for the first portion of the one or more sensing windows in accordance with the monitoring pattern. The data transmitter 935 may be configured as or otherwise support a means for transmitting data to at least a second UE based on transmitting the control signaling.

Additionally or alternatively, the communications manager 920 may support wireless communications at a second UE in accordance with examples as disclosed herein. The monitoring component 925 may be configured as or otherwise support a means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. The result indication component 930 may be configured as or otherwise support a means for transmitting, to one or more UEs, control signaling indicating a result of monitoring the set of sidelink resources for the first portion of the one or more sensing windows in accordance with the monitoring pattern. The data receiver 940 may be configured as or otherwise support a means for receiving data from at least a first UE based on transmitting the control signaling.

Additionally or alternatively, the communications manager 920 may support wireless communications at a third UE in accordance with examples as disclosed herein. The monitoring component 925 may be configured as or otherwise support a means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. The control signal transmitter 945 may be configured as or otherwise support a means for transmitting, to at least a first UE and a second UE, control signaling indicating a result of monitoring the set of sidelink resources for the first portion of the one or more sensing windows in accordance with the monitoring pattern.

Figure 10:
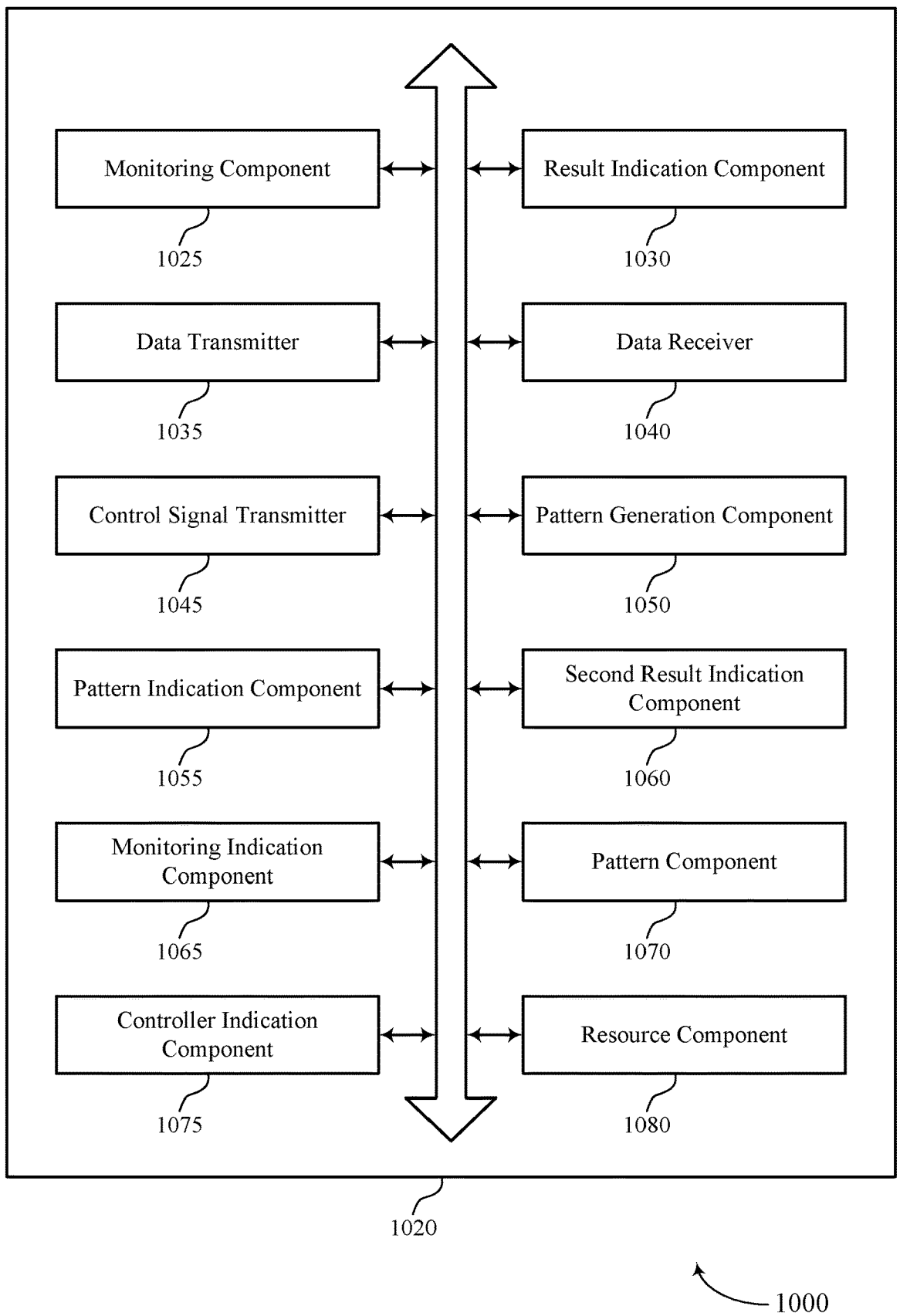
FIG. 10 shows a block diagram of a communications manager that supports cooperative and coordinated sensing techniques for wireless communications systems in accordance with one or more aspects of the present disclosure.

FIG. 10 shows a block diagram 1000 of a communications manager 1020 that supports cooperative and coordinated sensing techniques for wireless communications systems in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of cooperative and coordinated sensing techniques for wireless communications systems as described herein. For example, the communications manager 1020 may include a monitoring component 1025, a result indication component 1030, a data transmitter 1035, a data receiver 1040, a control signal transmitter 1045, a pattern generation component 1050, a pattern indication component 1055, a second result indication component 1060, a monitoring indication component 1065, a pattern component 1070, a controller indication component 1075, a resource component 1080, or any combination thereof. Each of these components may communicate, directly or indirectly, with one another (e.g., via one or more buses).

The communications manager 1020 may support wireless communications at a first UE in accordance with examples as disclosed herein. The monitoring component 1025 may be configured as or otherwise support a means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. The result indication component 1030 may be configured as or otherwise support a means for transmitting, to one or more UEs, control signaling indicating a result of monitoring the set of sidelink resources for the first portion of the one or more sensing windows in accordance with the monitoring pattern. The data transmitter 1035 may be configured as or otherwise support a means for transmitting data to at least a second UE based on transmitting the control signaling.

In some examples, the first portion includes a first sensing window of the one or more sensing windows and the second portion includes a second sensing window of the one or more sensing windows.

In some examples, the second result indication component 1060 may be configured as or otherwise support a means for receiving, from the second UE, second control signaling indicating a second result of the second UE monitoring a third portion of the one or more sensing windows, the third portion including the first sensing window, the second sensing window, or a combination thereof.

In some examples, the first portion includes a first duration of a first sensing window and the second portion includes a second duration of the first sensing window.

In some examples, the second result indication component 1060 may be configured as or otherwise support a means for receiving, from the second UE, second control signaling indicating a second result of the second UE monitoring a third portion of the one or more sensing windows, the third portion including the first duration of the first sensing window, the second duration of the first sensing window, or a third duration overlapping with one or both of the first duration and the second duration.

In some examples, the pattern generation component 1050 may be configured as or otherwise support a means for generating the monitoring pattern associated with monitoring the first portion of the one or more sensing windows, where the monitoring pattern includes a random pattern.

In some examples, the pattern indication component 1055 may be configured as or otherwise support a means for receiving an indication of the monitoring pattern from the second UE, a third UE, a base station, or any combination thereof.

In some examples, the controller indication component 1075 may be configured as or otherwise support a means for receiving a second indication that the second UE or the third UE is a controller UE, where receiving the indication of the monitoring pattern is based on the second UE or the third UE being the controller UE.

In some examples, the second result indication component 1060 may be configured as or otherwise support a means for receiving second control signaling indicating a second result of at least the second UE monitoring the set of sidelink resources for a third portion of the one or more sensing windows.

In some examples, the resource component 1080 may be configured as or otherwise support a means for selecting resources of the set of sidelink resources for transmitting the data based on receiving the second control signaling, where the result and the second result indicate that the selected resources are available.

In some examples, the control signal transmitter 1045 may be configured as or otherwise support a means for transmitting second control signaling indicating reserved resources of the set of sidelink resources. In some examples, the data transmitter 1035 may be configured as or otherwise support a means for transmitting the data to at least the second UE via the reserved resources.

Additionally or alternatively, the communications manager 1020 may support wireless communications at a second UE in accordance with examples as disclosed herein. In some examples, the monitoring component 1025 may be configured as or otherwise support a means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. In some examples, the result indication component 1030 may be configured as or otherwise support a means for transmitting, to one or more UEs, control signaling indicating a result of monitoring the set of sidelink resources for the first portion of the one or more sensing windows in accordance with the monitoring pattern. The data receiver 1040 may be configured as or otherwise support a means for receiving data from at least a first UE based on transmitting the control signaling.

In some examples, the first portion includes a first sensing window of the one or more sensing windows and the second portion includes a second sensing window of the one or more sensing windows.

In some examples, the second result indication component 1060 may be configured as or otherwise support a means for receiving, from the first UE, second control signaling indicating a second result of the first UE monitoring a third portion of the one or more sensing windows, the third portion including the first sensing window, the second sensing window, or a combination thereof. In some examples, the first portion includes a first duration of a first sensing window and the second portion includes a second duration of the first sensing window.

In some examples, the second result indication component 1060 may be configured as or otherwise support a means for receiving, from the first UE, second control signaling indicating a second result of the first UE monitoring a third portion of the one or more sensing windows, the third portion including the first duration of the first sensing window, the second duration of the first sensing window, or a third duration overlapping with one or both of the first duration and the second duration.

In some examples, the pattern generation component 1050 may be configured as or otherwise support a means for generating the monitoring pattern associated with monitoring the first portion of the one or more sensing windows, where the monitoring pattern includes a random pattern.

In some examples, the pattern indication component 1055 may be configured as or otherwise support a means for receiving an indication of the monitoring pattern from the first UE, a third UE, a base station, or any combination thereof.

In some examples, the controller indication component 1075 may be configured as or otherwise support a means for receiving a second indication that the first UE or the third UE is a controller UE, where receiving the indication of the monitoring pattern is based on the first UE or the third UE being the controller UE.

In some examples, the second result indication component 1060 may be configured as or otherwise support a means for receiving second control signaling indicating a second result of at least the first UE monitoring the set of sidelink resources for a third portion of the one or more sensing windows.

In some examples, the control signal transmitter 1045 may be configured as or otherwise support a means for receiving, from the first UE, second control signaling indicating reserved resources of the set of sidelink resources. In some examples, the data receiver 1040 may be configured as or otherwise support a means for receiving the data via the reserved resources.

Additionally or alternatively, the communications manager 1020 may support wireless communications at a third UE in accordance with examples as disclosed herein. In some examples, the monitoring component 1025 may be configured as or otherwise support a means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. The control signal transmitter 1045 may be configured as or otherwise support a means for transmitting, to at least a first UE and a second UE, control signaling indicating a result of monitoring the set of sidelink resources for the first portion of the one or more sensing windows in accordance with the monitoring pattern.

In some examples, the first portion overlaps with a third portion of the one or more sensing windows monitored by the first UE, a fourth portion of the one or more sensing windows monitored by the second UE, or a combination thereof. In some examples, the first portion includes a first sensing window of the one or more sensing windows and the second portion includes a second window of the one or more sensing windows. In some examples, the first portion includes a first duration of a first sensing window and the second portion includes a second duration of the first sensing window.

In some examples, the monitoring indication component 1065 may be configured as or otherwise support a means for receiving, from a base station or a controller UE, an indication to monitor the set of sidelink resources for the first portion of the one or more sensing windows.

In some examples, the pattern component 1070 may be configured as or otherwise support a means for determining a monitoring pattern associated with monitoring the set of sidelink resources, the monitoring pattern indicating the first portion of the one or more sensing windows, the second portion of the one or more sensing windows, or a combination thereof.

Figure 11:
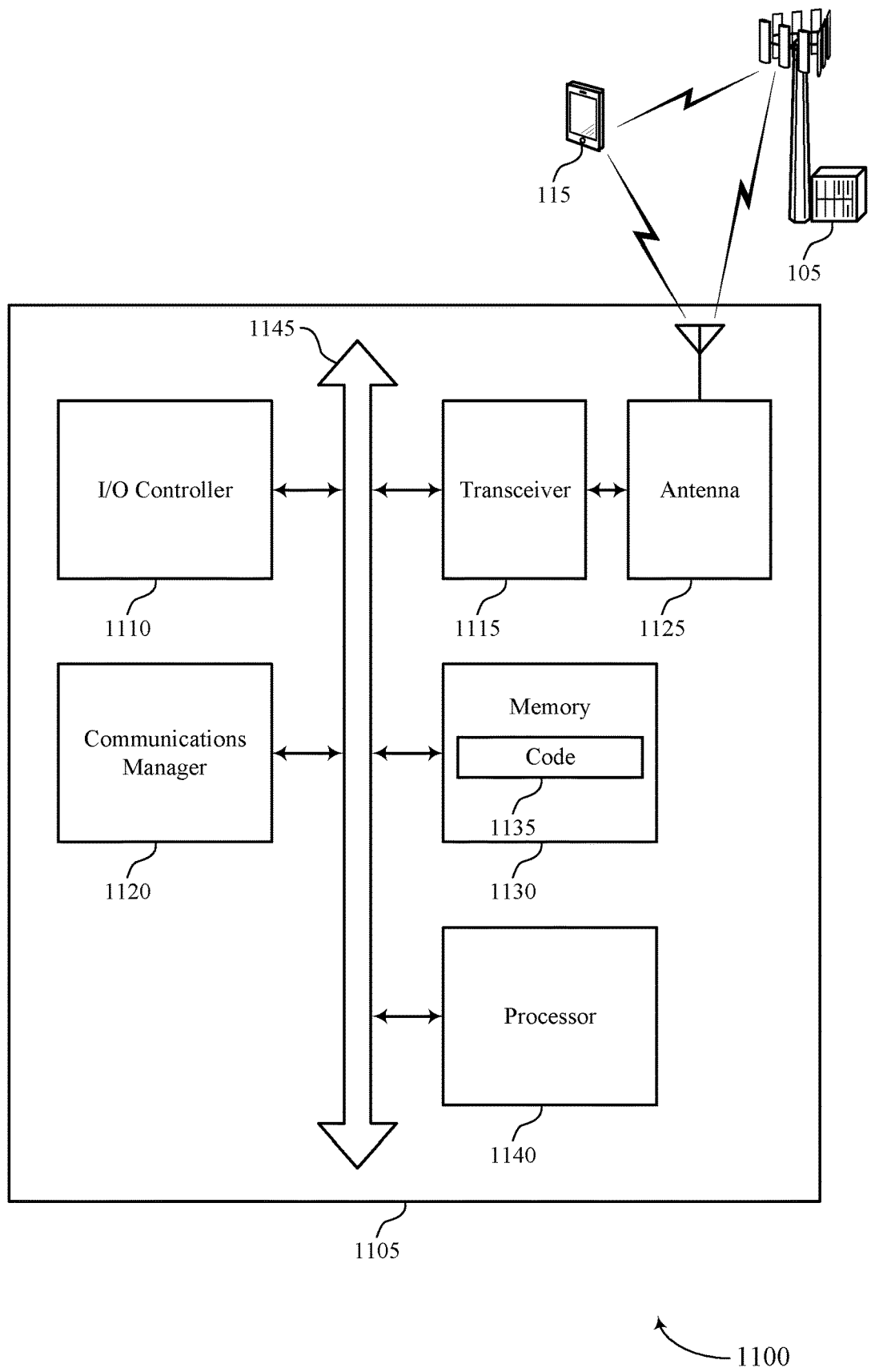
FIG. 11 shows a diagram of a system including a device that supports cooperative and coordinated sensing techniques for wireless communications systems in accordance with one or more aspects of the present disclosure.

FIG. 11 shows a diagram of a system 1100 including a device 1105 that supports cooperative and coordinated sensing techniques for wireless communications systems in accordance with one or more aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting cooperative and coordinated sensing techniques for wireless communications systems). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a first UE in accordance with examples as disclosed herein. For example, the communications manager 1120 may be configured as or otherwise support a means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. The communications manager 1120 may be configured as or otherwise support a means for transmitting, to one or more UEs, control signaling indicating a result of monitoring the set of sidelink resources for the first portion of the one or more sensing windows in accordance with the monitoring pattern. The communications manager 1120 may be configured as or otherwise support a means for transmitting data to at least a second UE based on transmitting the control signaling.

Additionally or alternatively, the communications manager 1120 may support wireless communications at a second UE in accordance with examples as disclosed herein. For example, the communications manager 1120 may be configured as or otherwise support a means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. The communications manager 1120 may be configured as or otherwise support a means for transmitting, to one or more UEs, control signaling indicating a result of monitoring the set of sidelink resources for the first portion of the one or more sensing windows in accordance with the monitoring pattern. The communications manager 1120 may be configured as or otherwise support a means for receiving data from at least a first UE based on transmitting the control signaling.

Additionally or alternatively, the communications manager 1120 may support wireless communications at a third UE in accordance with examples as disclosed herein. For example, the communications manager 1120 may be configured as or otherwise support a means for monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. The communications manager 1120 may be configured as or otherwise support a means for transmitting, to at least a first UE and a second UE, control signaling indicating a result of monitoring the set of sidelink resources for the first portion of the one or more sensing windows in accordance with the monitoring pattern.

By including or configuring the communications manager 1120 in accordance with examples as described herein, the device 1105 may support techniques for sensing as described herein. For example, the device 1105 may be enabled to monitor a portion of one or more sensing windows (e.g., partially monitor a sensing window, alternate monitoring sensing windows) as described herein. Additionally or alternatively, the device 1105 may share results of such monitoring with other devices. By sharing results, the device 1105 may be enabled to realize reduced power consumption (e.g., due to refraining from monitoring a portion of the sensing windows) while maintaining a relatively accurate resource map for reserving resources, which may reduce a likelihood of interference due to multiple devices attempting to reserve or communicate over the same resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of cooperative and coordinated sensing techniques for wireless communications systems as described herein, or the processor 1140 and the memory 1130 may be otherwise configured to perform or support such operations.

Figure 12:
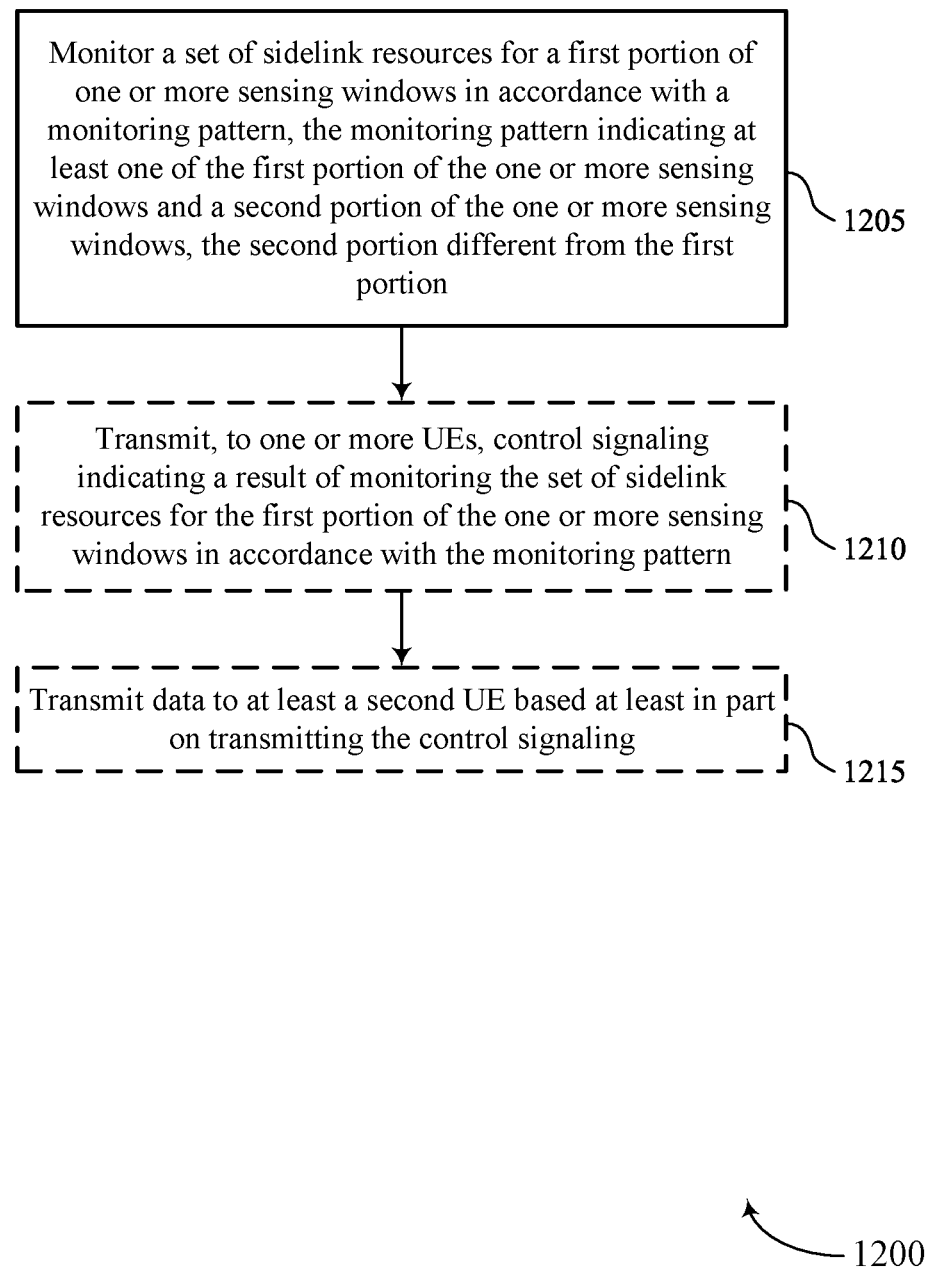
FIGS. 12 through 14 show flowcharts illustrating methods that support cooperative and coordinated sensing techniques for wireless communications systems in accordance with one or more aspects of the present disclosure.

FIG. 12 shows a flowchart illustrating a method 1200 that supports cooperative and coordinated sensing techniques for wireless communications systems in accordance with one or more aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1205, the method may include monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. The operations of 1205 may be performed in accordance with examples as disclosed herein. In some examples, aspects of the operations of 1205 may be performed by a monitoring component 1025 as described with reference to FIG. 10.

In some examples, at 1210 the method may include transmitting, to one or more UEs, control signaling indicating a result of monitoring the set of sidelink resources for the first portion of the one or more sensing windows in accordance with the monitoring pattern. The operations of 1210 may be performed in accordance with examples as disclosed herein. In some examples, aspects of the operations of 1210 may be performed by a result indication component 1030 as described with reference to FIG. 10.

In some examples, at 1215 the method may include transmitting data to at least a second UE based on transmitting the control signaling. The operations of 1215 may be performed in accordance with examples as disclosed herein. In some examples, aspects of the operations of 1215 may be performed by a data transmitter 1035 as described with reference to FIG. 10.

Figure 13:
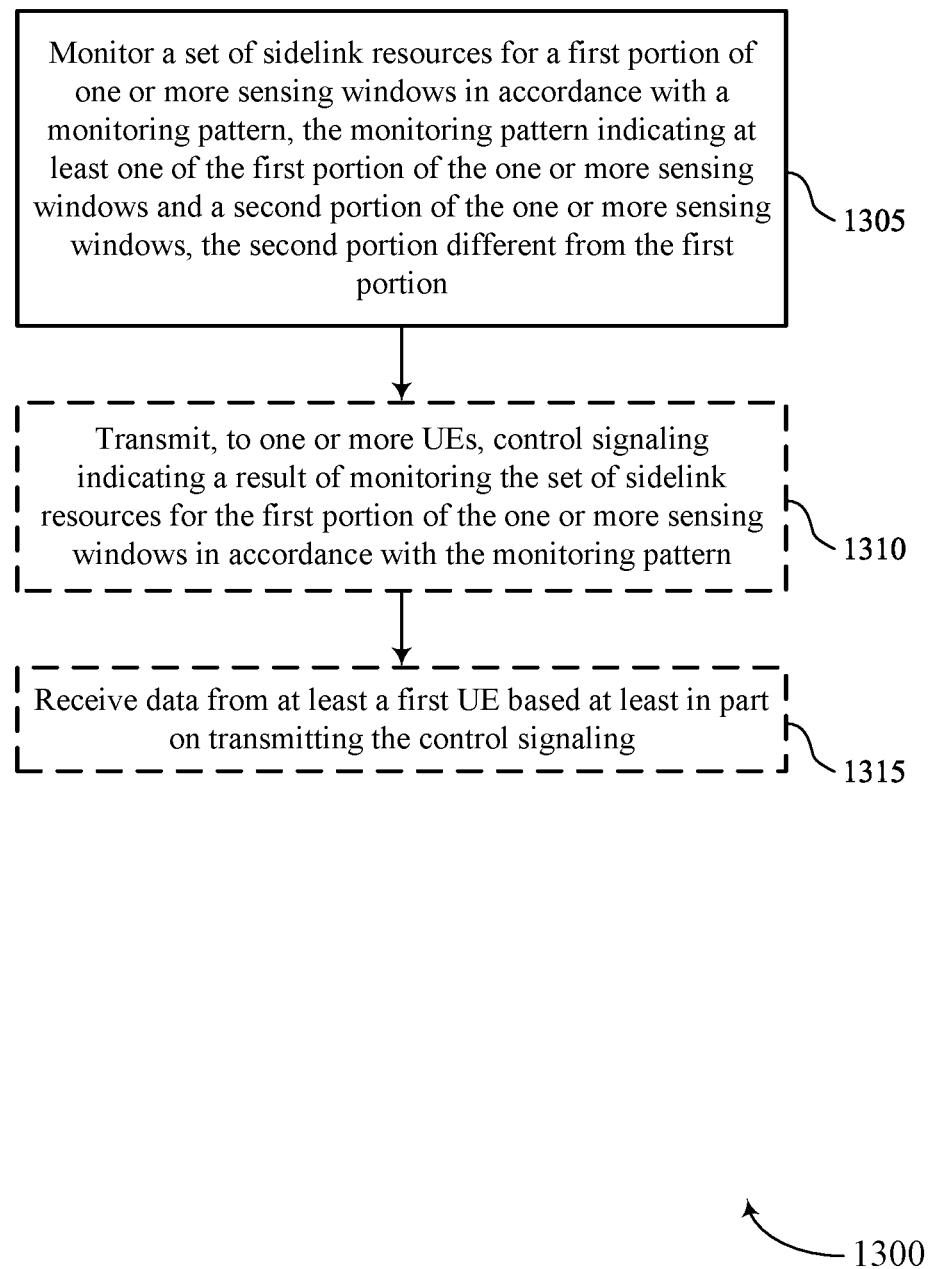

FIG. 13 shows a flowchart illustrating a method 1300 that supports cooperative and coordinated sensing techniques for wireless communications systems in accordance with one or more aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1305, the method may include monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. The operations of 1305 may be performed in accordance with examples as disclosed herein. In some examples, aspects of the operations of 1305 may be performed by a monitoring component 1025 as described with reference to FIG. 10.

In some examples, at 1310 the method may include transmitting, to one or more UEs, control signaling indicating a result of monitoring the set of sidelink resources for the first portion of the one or more sensing windows in accordance with the monitoring pattern. The operations of 1310 may be performed in accordance with examples as disclosed herein. In some examples, aspects of the operations of 1310 may be performed by a result indication component 1030 as described with reference to FIG. 10.

In some examples, at 1315 the method may include receiving data from at least a first UE based on transmitting the control signaling. The operations of 1315 may be performed in accordance with examples as disclosed herein. In some examples, aspects of the operations of 1315 may be performed by a data receiver 1040 as described with reference to FIG. 10.

Figure 14:
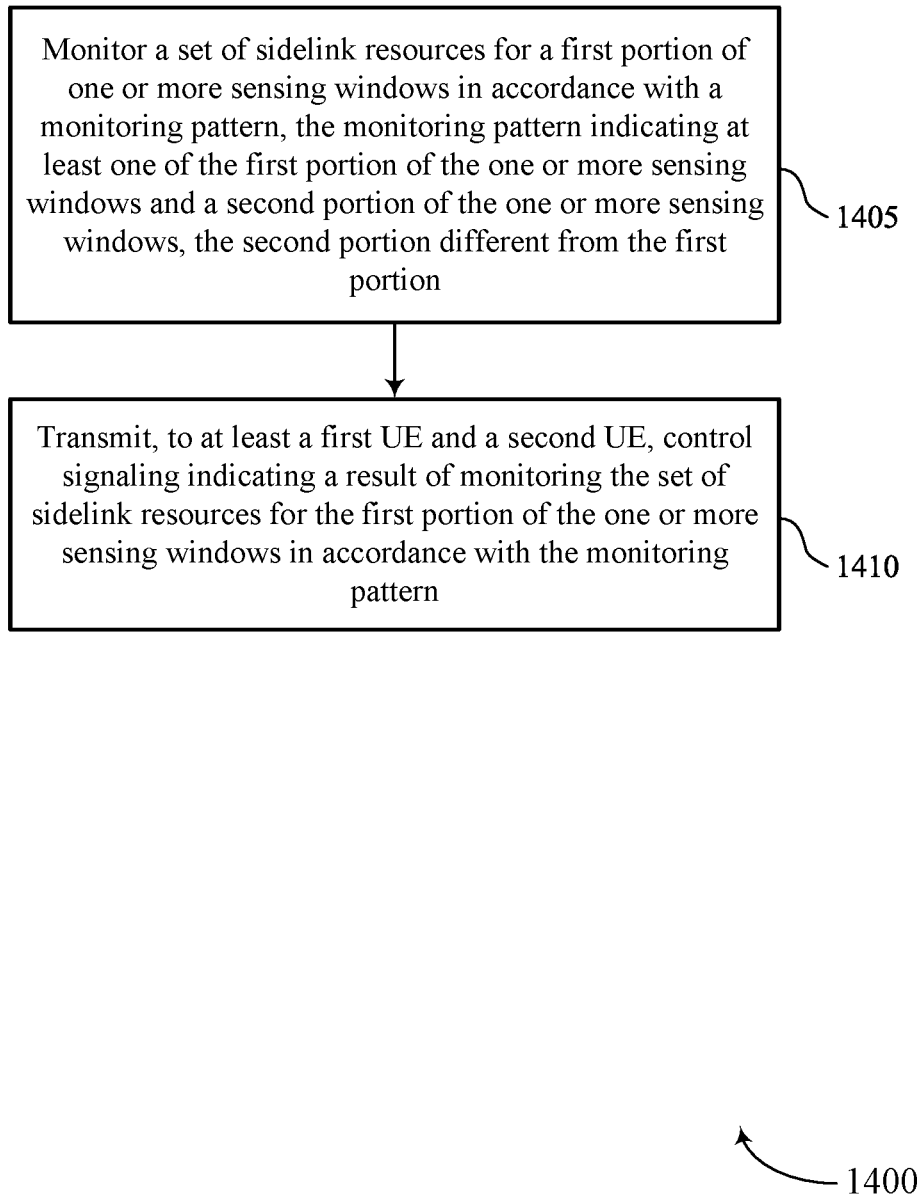

FIG. 14 shows a flowchart illustrating a method 1400 that supports cooperative and coordinated sensing techniques for wireless communications systems in accordance with one or more aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1405, the method may include monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion. The operations of 1405 may be performed in accordance with examples as disclosed herein. In some examples, aspects of the operations of 1405 may be performed by a monitoring component 1025 as described with reference to FIG. 10.

At 1410, the method may include transmitting, to at least a first UE and a second UE, control signaling indicating a result of monitoring the set of sidelink resources for the first portion of the one or more sensing windows in accordance with the monitoring pattern. The operations of 1410 may be performed in accordance with examples as disclosed herein. In some examples, aspects of the operations of 1410 may be performed by a control signal transmitter 1045 as described with reference to FIG. 10.

The following provides an overview of aspects of the present disclosure:

Aspect 1: A method for wireless communications at a first UE, comprising: monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion; transmitting, to one or more UEs, control signaling indicating a result of monitoring the set of sidelink resources for the first portion of the one or more sensing windows in accordance with the monitoring pattern; and transmitting data to at least a second UE based at least in part on transmitting the control signaling.

Aspect 2: The method of aspect 1, wherein the first portion comprises a first sensing window of the one or more sensing windows and the second portion comprises a second sensing window of the one or more sensing windows.

Aspect 3: The method of aspect 2, further comprising: receiving, from the second UE, second control signaling indicating a second result of the second UE monitoring a third portion of the one or more sensing windows, the third portion comprising the first sensing window, the second sensing window, or a combination thereof.

Aspect 4: The method of any of aspects 1 through 3, wherein the first portion comprises a first duration of a first sensing window and the second portion comprises a second duration of the first sensing window.

Aspect 5: The method of aspect 4, further comprising: receiving, from the second UE, second control signaling indicating a second result of the second UE monitoring a third portion of the one or more sensing windows, the third portion comprising the first duration of the first sensing window, the second duration of the first sensing window, or a third duration overlapping with one or both of the first duration and the second duration.

Aspect 6: The method of any of aspects 1 through 5, further comprising: generating the monitoring pattern associated with monitoring the first portion of the one or more sensing windows, wherein the monitoring pattern comprises a random pattern.

Aspect 7: The method of any of aspects 1 through 6, further comprising: receiving an indication of the monitoring pattern from the second UE, a third UE, a base station, or any combination thereof.

Aspect 8: The method of aspect 7, further comprising: receiving a second indication that the second UE or the third UE is a controller UE, wherein receiving the indication of the monitoring pattern is based at least in part on the second UE or the third UE being the controller UE.

Aspect 9: The method of any of aspects 1 through 8, further comprising: receiving second control signaling indicating a second result of at least the second UE monitoring the set of sidelink resources for a third portion of the one or more sensing windows.

Aspect 10: The method of aspect 9, further comprising: selecting resources of the set of sidelink resources for transmitting the data based at least in part on receiving the second control signaling, wherein the result and the second result indicate that the selected resources are available.

Aspect 11: The method of any of aspects 1 through 10, further comprising: transmitting second control signaling indicating reserved resources of the set of sidelink resources; and transmitting the data to at least the second UE via the reserved resources.

Aspect 12: A method for wireless communications at a second UE, comprising: monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion; transmitting, to one or more UEs, control signaling indicating a result of monitoring the set of sidelink resources for the first portion of the one or more sensing windows in accordance with the monitoring pattern; and receiving data from at least a first UE based at least in part on transmitting the control signaling.

Aspect 13: The method of aspect 12, wherein the first portion comprises a first sensing window of the one or more sensing windows and the second portion comprises a second sensing window of the one or more sensing windows.

Aspect 14: The method of aspect 13, further comprising: receiving, from the first UE, second control signaling indicating a second result of the first UE monitoring a third portion of the one or more sensing windows, the third portion comprising the first sensing window, the second sensing window, or a combination thereof.

Aspect 15: The method of any of aspects 12 through 14, wherein the first portion comprises a first duration of a first sensing window and the second portion comprises a second duration of the first sensing window.

Aspect 16: The method of aspect 15, further comprising: receiving, from the first UE, second control signaling indicating a second result of the first UE monitoring a third portion of the one or more sensing windows, the third portion comprising the first duration of the first sensing window, the second duration of the first sensing window, or a third duration overlapping with one or both of the first duration and the second duration.

Aspect 17: The method of any of aspects 12 through 16, further comprising: generating the monitoring pattern associated with monitoring the first portion of the one or more sensing windows, wherein the monitoring pattern comprises a random pattern.

Aspect 18: The method of any of aspects 12 through 17, further comprising: receiving an indication of the monitoring pattern from the first UE, a third UE, a base station, or any combination thereof.

Aspect 19: The method of aspect 18, further comprising: receiving a second indication that the first UE or the third UE is a controller UE, wherein receiving the indication of the monitoring pattern is based at least in part on the first UE or the third UE being the controller UE.

Aspect 20: The method of any of aspects 12 through 19, further comprising: receiving second control signaling indicating a second result of at least the first UE monitoring the set of sidelink resources for a third portion of the one or more sensing windows.

Aspect 21: The method of any of aspects 12 through 20, further comprising: receiving, from the first UE, second control signaling indicating reserved resources of the set of sidelink resources; and receiving the data via the reserved resources.

Aspect 22: A method for wireless communications at a third UE, comprising: monitoring a set of sidelink resources for a first portion of one or more sensing windows in accordance with a monitoring pattern, the monitoring pattern indicating at least one of the first portion of the one or more sensing windows and a second portion of the one or more sensing windows, the second portion different from the first portion; and transmitting, to at least a first UE and a second UE, control signaling indicating a result of monitoring the set of sidelink resources for the first portion of the one or more sensing windows in accordance with the monitoring pattern.

Aspect 23: The method of aspect 22, wherein the first portion overlaps with a third portion of the one or more sensing windows monitored by the first UE, a fourth portion of the one or more sensing windows monitored by the second UE, or a combination thereof.

Aspect 24: The method of any of aspects 22 through 23, wherein the first portion comprises a first sensing window of the one or more sensing windows and the second portion comprises a second window of the one or more sensing windows.

Aspect 25: The method of any of aspects 22 through 24, wherein the first portion comprises a first duration of a first sensing window and the second portion comprises a second duration of the first sensing window.

Aspect 26: The method of any of aspects 22 through 25, further comprising: receiving, from a base station or a controller UE, an indication to monitor the set of sidelink resources for the first portion of the one or more sensing windows.

Aspect 27: The method of any of aspects 22 through 26, further comprising: determining a monitoring pattern associated with monitoring the set of sidelink resources, the monitoring pattern indicating the first portion of the one or more sensing windows, the second portion of the one or more sensing windows, or a combination thereof.

Aspect 28: An apparatus for wireless communications at a first UE, comprising a processor and memory coupled to the processor, the processor and memory configured to perform a method of any of aspects 1 through 11.

Aspect29: An apparatus for wireless communications at a first UE, comprising at least one means for performing a method of any of aspects 1 through 11.

Aspect 30: A non-transitory computer-readable medium storing code for wireless communications at a first UE, the code comprising instructions executable by a processor to perform a method of any of aspects 1 through 11.

Aspect 31: An apparatus for wireless communications at a second UE, comprising a processor and memory coupled to the processor, the processor and memory configured to perform a method of any of aspects 12 through 21.

Aspect 32: An apparatus for wireless communications at a second UE, comprising at least one means for performing a method of any of aspects 12 through 21.

Aspect 33: A non-transitory computer-readable medium storing code for wireless communications at a second UE, the code comprising instructions executable by a processor to perform a method of any of aspects 12 through 21.

Aspect 34: An apparatus for wireless communications at a third UE, comprising a processor and memory coupled to the processor, the processor and memory configured to perform a method of any of aspects 22 through 27.

Aspect 35: An apparatus for wireless communications at a third UE, comprising at least one means for performing a method of any of aspects 22 through 27.

Aspect 36: A non-transitory computer-readable medium storing code for wireless communications at a third UE, the code comprising instructions executable by a processor to perform a method of any of aspects 22 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
monitoring a set of sidelink resources for a first portion of one or more sensing windows in accordance with a first monitoring pattern associated with the first UE, the first monitoring pattern different from a second monitoring pattern associated with a second UE and indicating the first portion of the one or more sensing windows and a second portion of the one or more sensing windows, the second portion different from the first portion, wherein the first monitoring pattern is based at least in part on an indication from the second UE, a third UE, or any combination thereof;

transmitting, to one or more UEs including at least the second UE, first control signaling indicating the first monitoring pattern and a first result of monitoring the set of sidelink resources for the first portion of the one or more sensing windows in accordance with the first monitoring pattern, wherein the first monitoring pattern indicates that the set of sidelink resources in the second portion is available to at least the second UE;

receiving second control signaling indicating a second result of at least the second UE monitoring the set of sidelink resources for a third portion of the one or more sensing windows in accordance with the second monitoring pattern associated with the second UE;

selecting one or more resources from the set of sidelink resources based at least in part on the first result, the second result, the first monitoring pattern, and the second monitoring pattern; and transmitting, based at least in part on the selected one or more resources, data to at least the second UE.

2. The method of claim 1, wherein the first portion comprises a first sensing window of the one or more sensing windows and the second portion comprises a second sensing window of the one or more sensing windows.

3. The method of claim 2, wherein the third portion comprises a third sensing window.

4. The method of claim 1, wherein the first portion comprises a first duration of a first sensing window and the second portion comprises a second duration of the first sensing window.

5. The method of claim 4, wherein the third portion comprises a third duration of the first sensing window.

6. The method of claim 1, further comprising:
generating the first monitoring pattern associated with monitoring the first portion of the one or more sensing windows, wherein the first monitoring pattern comprises a random pattern.

7. The method of claim 1, further comprising:
receiving a second indication that the second UE or the third UE is a controller UE, wherein receiving the indication of the first monitoring pattern is based at least in part on the second UE or the third UE being the controller UE.

8. The method of claim 1, further comprising:
selecting the one or more resources of the set of sidelink resources for transmitting the data based at least in part on receiving the second control signaling, wherein the first result and the second result indicate that the selected one or more resources are available.

9. The method of claim 1, further comprising:
transmitting third control signaling indicating reserved resources of the set of sidelink resources; and
transmitting the data to at least the second UE via the reserved resources.

10. A method for wireless communications at a second user equipment (UE), comprising:
monitoring a set of sidelink resources for a first portion of one or more sensing windows in accordance with a second monitoring pattern associated with the second UE, the second monitoring pattern different from a first monitoring pattern associated with a first UE and indicating the first portion of the one or more sensing windows and a second portion of the one or more sensing windows, the second portion different from the first portion, wherein the second monitoring pattern is based at least in part on an indication from the first UE, a third UE, or any combination thereof;

transmitting, to one or more UEs including at least the first UE, first control signaling indicating the second monitoring pattern and a first result of monitoring the set of sidelink resources for the first portion of the one or more sensing windows in accordance with the second monitoring pattern, wherein the second monitoring pattern indicates that the set of sidelink resources in the second portion is available to at least the first UE;

receiving second control signaling indicating a second result of at least the first UE monitoring the set of sidelink resources for a third portion of the one or more sensing windows in accordance with the first monitoring pattern associated with the first UE;

selecting one or more resources from the set of sidelink resources based at least in part on the first result, the second result, the first monitoring pattern, and the second monitoring pattern; and receiving, based at least in part on the selected one or more resources, data from at least the first UE.

11. The method of claim 10, wherein the first portion comprises a first sensing window of the one or more sensing windows and the second portion comprises a second sensing window of the one or more sensing windows.

12. The method of claim 11, wherein the third portion comprises a third sensing window, the second sensing window, or a combination thereof.

13. The method of claim 10, wherein the first portion comprises a first duration of a first sensing window and the second portion comprises a second duration of the first sensing window.

14. The method of claim 13, wherein the third portion comprises a third duration of the first sensing window.

15. The method of claim 10, further comprising:
generating the second monitoring pattern associated with monitoring the first portion of the one or more sensing windows, wherein the second monitoring pattern comprises a random pattern.

16. The method of claim 10, further comprising:
receiving a second indication that the first UE or the third UE is a controller UE, wherein receiving the indication of the second monitoring pattern is based at least in part on the first UE or the third UE being the controller UE.

17. The method of claim 10, further comprising:
receiving, from the first UE, third control signaling indicating reserved resources of the set of sidelink resources; and
receiving the data via the reserved resources.

18. A method for wireless communications at a third user equipment (UE), comprising:
monitoring a set of sidelink resources for a first portion of one or more sensing windows in accordance with a third monitoring pattern associated with the third UE, the third monitoring pattern different from a first monitoring pattern associated with a first UE and indicating the first portion of the one or more sensing windows and a second portion of the one or more sensing windows, the second portion different from the first portion, wherein the third monitoring pattern is based at least in part on an indication from the first UE, a second UE, or any combination thereof;

transmitting, to at least the first UE and the second UE, first control signaling indicating the third monitoring pattern and a first result of monitoring the set of sidelink resources for the first portion of the one or more sensing windows in accordance with the third monitoring pattern, wherein the third monitoring pattern indicates that the set of sidelink resources in the second portion is available to at least the first UE and the second UE;
receiving second control signaling indicating a second result of the first UE monitoring the set of sidelink resources for a third portion of the one or more sensing windows in accordance with the first monitoring pattern associated with the first UE;
receiving third control signaling indicating a third result of the second UE monitoring the set of sidelink resources for a fourth portion of the one or more sensing windows in accordance with a second monitoring pattern associated with the second UE; and
selecting one or more resources from the set of sidelink resources based at least in part on the first result, the second result, the third result, the first monitoring pattern, the second monitoring pattern, and the third monitoring pattern.

19. The method of claim 18, wherein the first portion comprises a first sensing window of the one or more sensing windows, the second portion comprises a second sensing window of the one or more sensing windows, the third portion comprises a third sensing window of the one or more sensing windows, and the fourth portion comprises a fourth sensing window of the one or more sensing windows.

20. The method of claim 18, wherein the first portion comprises a first duration of a first sensing window, the second portion comprises a second duration of the first sensing window, the third portion comprises a third duration of the first sensing window, and the fourth portion comprises a fourth duration of the first sensing window.

21. The method of claim 18, further comprising:
determining the third monitoring pattern associated with monitoring the set of sidelink resources, the third monitoring pattern indicating the first portion of the one or more sensing windows, the second portion of the one or more sensing windows, or a combination thereof.

22. An apparatus for wireless communications at a first user equipment (UE), comprising:
one or more processors; and
one or more memories coupled with the one or more processors and configured to cause the first UE to:
monitor a set of sidelink resources for a first portion of one or more sensing windows in accordance with a first monitoring pattern associated with the first UE, the first monitoring pattern different from a second monitoring pattern associated with a second UE, wherein the first monitoring pattern indicates the first portion of the one or more sensing windows and a second portion of the one or more sensing windows, the second portion different from the first portion, wherein the first monitoring pattern is based at least in part on an indication from the second UE, a third UE, or any combination thereof;
transmit, to one or more UEs including at least the second UE, first control signaling that indicates the first monitoring pattern and a first result of the monitored set of sidelink resources for the first portion of the one or more sensing windows in accordance with the first monitoring pattern, wherein the first monitoring pattern indicates that the set of sidelink resources in the second portion is available to at least the second UE;
receive, from the one or more UEs including at least the second UE, second control signaling that indicates a second result of the monitored set of sidelink resources for a third portion of the one or more sensing windows in accordance with the second monitoring pattern associated with the second UE;
select one or more resources from the set of sidelink resources based at least in part on the first result, the second result, the first monitoring pattern, and the second monitoring pattern; and
transmit, based at least in part on the selected one or more resources, data to at least the second UE.

23. The apparatus of claim 22, wherein the first portion comprises a first sensing window of the one or more sensing windows and the second portion comprises a second sensing window of the one or more sensing windows.

24. The apparatus of claim 23, wherein the third portion comprises a third sensing window.

25. The apparatus of claim 22, wherein the first portion comprises a first duration of a first sensing window and the second portion comprises a second duration of the first sensing window.

26. The apparatus of claim 25, wherein the third portion comprises a third duration of the first sensing window.

27. The apparatus of claim 22, wherein the one or more processors are further configured to cause the first UE to:
generate the first monitoring pattern associated with the first portion of the one or more sensing windows, wherein the first monitoring pattern comprises a random pattern.

28. The apparatus of claim 22, wherein the one or more processors are further configured to cause the first UE to:
receive a second indication that the second UE or the third UE is a controller UE, wherein the indication of the first monitoring pattern is based at least in part on the second UE or the third UE being the controller UE.

29. The apparatus of claim 22, wherein the one or more processors are further configured to cause the first UE to:
select the one or more resources of the set of sidelink resources for the data based at least in part on the received second control signaling, wherein the first result and the second result indicate that the selected one or more resources are available.

30. The apparatus of claim 22, wherein the one or more processors are further configured to cause the first UE to:
transmit third control signaling that indicates reserved resources of the set of sidelink resources; and
transmit the data to at least the second UE via the reserved resources.

31. An apparatus for wireless communications at a second user equipment (UE), comprising:
one or more processors; and
one or more memories coupled with the one or more processors and configured to cause the second UE to:
monitor a set of sidelink resources for a first portion of one or more sensing windows in accordance with a second monitoring pattern associated with the second UE, the second monitoring pattern different from a first monitoring pattern associated with a first UE, wherein the second monitoring pattern indicates the first portion of the one or more sensing windows and a second portion of the one or more sensing windows, the second portion different from the first portion, wherein the second monitoring pattern is based at least in part on an indication from the first UE, a third UE, or any combination thereof;
transmit, to one or more UEs including at least the first UE, first control signaling that indicates the second monitoring pattern and a first result of the monitored set of sidelink resources for the first portion of the one or more sensing windows in accordance with the second monitoring pattern, wherein the second monitoring pattern indicates that the set of sidelink resources in the second portion is available to at least the first UE;
receive, from the one or more UEs including at least the first UE, second control signaling that indicates a second result of the monitored set of sidelink resources for a third portion of the one or more sensing windows in accordance with the first monitoring pattern associated with the first UE;
select one or more resources from the set of sidelink resources based at least in part on the first result, the second result, the first monitoring pattern, and the second monitoring pattern; and
receive, based at least in part on the selected one or more resources, data from at least the first UE.

32. The apparatus of claim 31, wherein the first portion comprises a first sensing window of the one or more sensing windows and the second portion comprises a second sensing window of the one or more sensing windows.

33. The apparatus of claim 32, wherein the third portion comprises a third sensing window, the second sensing window, or a combination thereof.

34. The apparatus of claim 31, wherein the first portion comprises a first duration of a first sensing window and the second portion comprises a second duration of the first sensing window.

35. The apparatus of claim 34, wherein the third portion comprises a third duration of the first sensing window.

36. The apparatus of claim 31, wherein the one or more processors are further configured to cause the second UE to:
generate the second monitoring pattern associated with the first portion of the one or more sensing windows, wherein the second monitoring pattern comprises a random pattern.

37. The apparatus of claim 31, wherein the one or more processors are further configured to cause the second UE to:
generate the second monitoring pattern associated with the first portion of the one or more sensing windows, wherein the second monitoring pattern comprises a random pattern.

38. The apparatus of claim 31, wherein the one or more processors are further configured to cause the second UE to:
receive a second indication that the first UE or the third UE is a controller UE, wherein the indication of the second monitoring pattern is based at least in part on the first UE or the third UE being the controller UE.

39. The apparatus of claim 31, wherein the one or more processors are further configured to cause the second UE to:
receive, from the first UE, third control signaling that indicates reserved resources of the set of sidelink resources; and
receive the data via the reserved resources.

40. An apparatus for wireless communications at a third user equipment (UE), comprising:
one or more processors; and
one or more memories coupled with the one or more processors and configured to cause the third UE to:
monitor a set of sidelink resources for a first portion of one or more sensing windows in accordance with a third monitoring pattern associated with the third UE, the third monitoring pattern different from a first monitoring pattern associated with a first UE, wherein the third monitoring pattern indicates the first portion of the one or more sensing windows and a second portion of the one or more sensing windows, the second portion different from the first portion, wherein the third monitoring pattern is based at least in part on an indication from the first UE, a second UE, or any combination thereof;
transmit, to at least the first UE and the second UE, first control signaling that indicates the third monitoring pattern a first result of the monitored set of sidelink resources for the first portion of the one or more sensing windows in accordance with the third monitoring pattern, wherein the third monitoring pattern indicates that the set of sidelink resources in the second portion is available to at least the first UE and the second UE;
receive, from at least the first UE, second control signaling that indicates a second result of the monitored set of sidelink resources for a third portion of the one or more sensing windows in accordance with the first monitoring pattern associated with the first UE;
receive, from at least the second UE, third control signaling that indicates a third result of the monitored set of sidelink resources for a fourth portion of the one or more sensing windows in accordance with a second monitoring pattern associated with the second UE; and
select one or more resources from the set of sidelink resources based at least in part on the first result, the second result, the third result, the first monitoring pattern, the second monitoring pattern, and the third monitoring pattern.

41. The apparatus of claim 40, wherein the first portion comprises a first sensing window of the one or more sensing windows, the second portion comprises a second sensing window of the one or more sensing windows, the third portion comprises a third sensing window of the one or more sensing windows, and the fourth portion comprises a fourth sensing window of the one or more sensing windows.

42. The apparatus of claim 40, wherein the first portion comprises a first duration of a first sensing window, the second portion comprises a second duration of the first sensing window, the third portion comprises a third duration of the first sensing window, and the fourth portion comprises a fourth duration of the first sensing window.

43. The apparatus of claim 40, wherein the one or more processors are further configured to cause the third UE to:
determine the third monitoring pattern associated with the monitored set of sidelink resources, wherein the third monitoring pattern indicates the first portion of the one or more sensing windows, the second portion of the one or more sensing windows, or a combination thereof.

44. A non-transitory computer-readable medium storing code for wireless communications at a first user equipment (UE), the code comprising instructions executable by one or more processors to:
monitor a set of sidelink resources for a first portion of one or more sensing windows in accordance with a first monitoring pattern associated with the first UE, the first monitoring pattern different from a second monitoring pattern associated with a second UE and indicating the first portion of the one or more sensing windows and a second portion of the one or more sensing windows, the second portion different from the first portion, wherein the first monitoring pattern is based at least in part on an indication from the second UE, a third UE, or any combination thereof;
transmit, to one or more UEs including at least the second UE, first control signaling indicating the first monitoring pattern and a first result of monitoring the set of sidelink resources for the first portion of the one or more sensing windows in accordance with the first monitoring pattern, wherein the first monitoring pattern indicates that the set of sidelink resources in the second portion is available to at least the second UE;
receive second control signaling indicating a second result of at least the second UE monitoring the set of sidelink resources for a third portion of the one or more sensing windows in accordance with the second monitoring pattern associated with the second UE;
select one or more resources from the set of sidelink resources based at least in part on the first result, the second result, the first monitoring pattern, and the second monitoring pattern; and
transmit, based at least in part on the selected one or more resources, data to at least the second UE.

45. The non-transitory computer-readable medium of claim 44, wherein the first portion comprises a first sensing window of the one or more sensing windows and the second portion comprises a second sensing window of the one or more sensing windows.

46. The non-transitory computer-readable medium of claim 45, wherein the third portion comprises a third sensing window.

47. A non-transitory computer-readable medium storing code for wireless communications at a second user equipment (UE), the code comprising instructions executable by one or more processors to:
monitor a set of sidelink resources for a first portion of one or more sensing windows in accordance with a second monitoring pattern associated with the second UE, the second monitoring pattern different from a first monitoring pattern associated with a first UE and indicating the first portion of the one or more sensing windows and a second portion of the one or more sensing windows, the second portion different from the first portion, wherein the second monitoring pattern is based at least in part on an indication from the first UE, a third UE, or any combination thereof;
transmit, to one or more UEs including at least the first UE, first control signaling indicating the second monitoring pattern and a first result of monitoring the set of sidelink resources for the first portion of the one or more sensing windows in accordance with the second monitoring pattern, wherein the second monitoring pattern indicates that the set of sidelink resources in the second portion is available to at least the first UE;
receive second control signaling indicating a second result of at least the first UE monitoring the set of sidelink resources for a third portion of the one or more sensing windows in accordance with the first monitoring pattern associated with the first UE;
select one or more resources from the set of sidelink resources based at least in part on the first result, the second result, the first monitoring pattern, and the second monitoring pattern; and
receive, based at least in part on the selected one or more resources, data from at least the first UE.

48. The non-transitory computer-readable medium of claim 47, wherein the first portion comprises a first sensing window of the one or more sensing windows and the second portion comprises a second sensing window of the one or more sensing windows.

49. The non-transitory computer-readable medium of claim 48, wherein the third portion comprises a third sensing window, the second sensing window, or a combination thereof.

50. A non-transitory computer-readable medium storing code for wireless communications at a third user equipment (UE), the code comprising instructions executable by one or more processors to:
monitor a set of sidelink resources for a first portion of one or more sensing windows in accordance with a third monitoring pattern associated with the third UE, the third monitoring pattern different from a first monitoring pattern associated with a first UE and indicating the first portion of the one or more sensing windows and a second portion of the one or more sensing windows, the second portion different from the first portion wherein the third monitoring pattern is based at least in part on an indication from the first UE, a second UE, or any combination thereof;
transmit, to at least the first UE and the second UE, first control signaling indicating the third monitoring pattern and a first result of monitoring the set of sidelink resources for the first portion of the one or more sensing windows in accordance with the third monitoring pattern, wherein the third monitoring pattern indicates that the set of sidelink resources in the second portion is available to at least the first UE and the second UE;
receive second control signaling indicating a second result of the first UE monitoring the set of sidelink resources for a third portion of the one or more sensing windows in accordance with the first monitoring pattern associated with the first UE;
receive third control signaling indicating a third result of the second UE monitoring the set of sidelink resources for a fourth portion of the one or more sensing windows in accordance with a second monitoring pattern associated with the second UE; and
select one or more resources from the set of sidelink resources based at least in part on the first result, the second result, the third result, the first monitoring pattern, the second monitoring pattern, and the third monitoring pattern.

51. The non-transitory computer-readable medium of claim 50, wherein the first portion comprises a first sensing window of the one or more sensing windows, the second portion comprises a second sensing window of the one or more sensing windows, the third portion comprises a third sensing window of the one or more sensing windows, and the fourth portion comprises a fourth sensing window of the one or more sensing windows.

52. An apparatus for wireless communications at a first user equipment (UE), comprising:
means for monitoring a set of sidelink resources for a first portion of one or more sensing windows in accordance with a first monitoring pattern associated with the first UE, the first monitoring pattern different from a second monitoring pattern associated with a second UE and indicating the first portion of the one or more sensing windows and a second portion of the one or more sensing windows, the second portion different from the first portion, wherein the first monitoring pattern is based at least in part on an indication from the second UE, a third UE, or any combination thereof;
means for transmitting, to one or more UEs including at least the second UE, first control signaling indicating the first monitoring pattern and a first result of monitoring the set of sidelink resources for the first portion of the one or more sensing windows in accordance with the first monitoring pattern, wherein the first monitoring pattern indicates that the set of sidelink resources in the second portion is available to at least the second UE;

means for receiving second control signaling indicating a second result of at least the second UE monitoring the set of sidelink resources for a third portion of the one or more sensing windows in accordance with the second monitoring pattern associated with the second UE;

means for selecting one or more resources from the set of sidelink resources based at least in part on the first result, the second result, the first monitoring pattern, and the second monitoring pattern; and means for transmitting, based at least in part on the selected one or more resources, data to at least the second UE.

53. The apparatus of claim 52, wherein the first portion comprises a first sensing window of the one or more sensing windows and the second portion comprises a second sensing window of the one or more sensing windows.

54. The apparatus of claim 53, wherein the third portion comprises a third sensing window.

55. An apparatus for wireless communications at a second user equipment (UE), comprising:

means for monitoring a set of sidelink resources for a first portion of one or more sensing windows in accordance with a second monitoring pattern associated with the second UE, the second monitoring pattern different from a first monitoring pattern associated with a first UE and indicating the first portion of the one or more sensing windows and a second portion of the one or more sensing windows, the second portion different from the first portion, wherein the second monitoring pattern is based at least in part on an indication from the first UE, a third UE, or any combination thereof;

means for transmitting, to one or more UEs including at least the first UE, first control signaling indicating the second monitoring pattern and a first result of monitoring the set of sidelink resources for the first portion of the one or more sensing windows in accordance with the second monitoring pattern, wherein the second monitoring pattern indicates that the set of sidelink resources in the second portion is available to at least the first UE;

means for receiving second control signaling indicating a second result of at least the first UE monitoring the set of sidelink resources for a third portion of the one or more sensing windows in accordance with the first monitoring pattern associated with the first UE;

means for selecting one or more resources from the set of sidelink resources based at least in part on the first result, the second result, the first monitoring pattern, and the second monitoring pattern; and means for receiving, based at least in part on the selected one or more resources, data from at least the first UE based at least in part on transmitting the first control signaling and receiving the second control signaling.

56. The apparatus of claim 55, wherein the first portion comprises a first sensing window of the one or more sensing windows and the second portion comprises a second sensing window of the one or more sensing windows.

57. The apparatus of claim 56, wherein the third portion comprises a third sensing window, the second sensing window, or a combination thereof.

58. An apparatus for wireless communications at a third user equipment (UE), comprising:

means for monitoring a set of sidelink resources for a first portion of one or more sensing windows in accordance with a third monitoring pattern associated with the third UE, the third monitoring pattern different from a first monitoring pattern associated with a first UE and indicating the first portion of the one or more sensing windows and a second portion of the one or more sensing windows, the second portion different from the first portion wherein the third monitoring pattern is based at least in part on an indication from the first UE, a second UE, or any combination thereof;

means for transmitting, to at least the first UE and the second UE, first control signaling indicating the third monitoring pattern and a first result of monitoring the set of sidelink resources for the first portion of the one or more sensing windows in accordance with the third monitoring pattern, wherein the third monitoring pattern indicates that the set of sidelink resources in the second portion is available to at least the first UE and the second UE;

means for receiving second control signaling indicating a second result of the first UE monitoring the set of sidelink resources for a third portion of the one or more sensing windows in accordance with the first monitoring pattern associated with the first UE;

means for receiving third control signaling indicating a third result of the second UE monitoring the set of sidelink resources for a fourth portion of the one or more sensing windows in accordance with a second monitoring pattern associated with the second UE; and means for selecting one or more resources from the set of sidelink resources based at least in part on the first result, the second result, the third result, the first monitoring pattern, the second monitoring pattern, and the third monitoring pattern.

59. The apparatus of claim 58, wherein the first portion comprises a first sensing window of the one or more sensing windows, the second portion comprises a second sensing window of the one or more sensing windows, the third portion comprises a third sensing window of the one or more sensing windows, and the fourth portion comprises a fourth sensing window of the one or more sensing windows.

* * * * *